US010060413B2

(12) United States Patent
Pitre

(10) Patent No.: US 10,060,413 B2
(45) Date of Patent: Aug. 28, 2018

(54) WIND TURBINE WITH AUTOMATIC TILTING FRAME FOR UNLOADING DAMAGING WINDS ENCOUNTERED BY WIND TURBINES

(71) Applicant: Natural Power Concepts, Inc., Honolulu, HI (US)

(72) Inventor: John Pitre, Honolulu, HI (US)

(73) Assignee: Natural Power Concepts, Inc., Honolulu, HI (US)

(*) Notice: Subject to any disclaimer, the term of this patent is extended or adjusted under 35 U.S.C. 154(b) by 406 days.

(21) Appl. No.: 14/609,732

(22) Filed: Jan. 30, 2015

(65) Prior Publication Data

US 2015/0219072 A1  Aug. 6, 2015

Related U.S. Application Data

(60) Provisional application No. 61/934,191, filed on Jan. 31, 2014.

(51) Int. Cl.
*F03D 7/04* (2006.01)
*F03D 7/02* (2006.01)
*F03D 1/06* (2006.01)

(52) U.S. Cl.
CPC ......... *F03D 7/0216* (2013.01); *F03D 1/0666* (2013.01); *F03D 7/041* (2013.01); *F05B 2240/2022* (2013.01); *F05B 2240/33* (2013.01); *Y02E 10/721* (2013.01); *Y02E 10/723* (2013.01)

(58) Field of Classification Search
CPC .......... F05B 2240/2022; F05B 2240/33; F05B 2260/74; F05B 2270/329; F03D 1/04; F03D 1/065; F03D 1/0666; F03D 7/0204; F03D 7/0208; F03D 7/0216; F03D 7/0224; F03D 7/0268; F05D 2260/72; F05D 2260/74
USPC ..................... 415/4.3; 416/9, 10, 11, 12, 13
See application file for complete search history.

(56) References Cited

U.S. PATENT DOCUMENTS

| | | | | |
|---|---|---|---|---|
| 2,026,828 | A * | 1/1936 | Dunn | F03D 7/0216 290/55 |
| 2,094,917 | A * | 10/1937 | Dunn | F03D 7/0216 290/55 |
| 2,178,047 | A * | 10/1939 | Malme | F03D 7/0212 290/44 |
| 4,183,717 | A * | 1/1980 | Yamada | F03D 1/02 416/121 |
| 4,767,939 | A * | 8/1988 | Calley | F03D 7/0216 290/44 |

(Continued)

*Primary Examiner* — Matthew W Jellett
(74) *Attorney, Agent, or Firm* — Polsinelli PC

(57) ABSTRACT

A wind turbine assembly is provided. The assembly includes a support structure and a wind turbine mounted on the support structure. The wind turbine includes a front face with blades defining a surface area to engage incoming wind, a roll axis about which the wind turbine can rotate in response to incoming wind to drive an electric generator, where the support structure defines a horizontal tilt axis about which the wind turbine can pitch forward and backward. The tilt axis divides the surface area of the wind turbine into upper and lower portions of unequal size, such that incoming wind on the front face of the wind turbine applies unequal force to the upper and lower portions of the surface area of the wind turbine to induce pitch of the wind turbine about the tilt axis.

16 Claims, 45 Drawing Sheets

Front perspective view
Rest position

(56) References Cited

U.S. PATENT DOCUMENTS

| | | | | |
|---|---|---|---|---|
| 5,295,793 A * | 3/1994 | Belden | ............... | F03D 7/0216 |
| | | | | 416/10 |
| 6,132,172 A * | 10/2000 | Li | ............... | F03D 7/0216 |
| | | | | 415/4.3 |
| 6,979,175 B2 * | 12/2005 | Drake | ............... | F03D 1/00 |
| | | | | 416/11 |
| 2004/0076518 A1 * | 4/2004 | Drake | ............... | F03D 1/00 |
| | | | | 416/10 |
| 2008/0292460 A1 * | 11/2008 | Kuo | ............... | F03D 3/067 |
| | | | | 416/140 |

\* cited by examiner

Front perspective view
Natural maximum wind position

100

Rear view
High wind position

Rear view
Natural maximum wind position

Rear view
Substantially horizontal position

Front view
Substantially vertical position

Front view
High wind position

Front view
Natural maximum wind position

Front view
Substantially horizontal position

Fig. 16 Side view Rest position

Fig. 17 Side view
Substantially vertical position

Side view
Natural maximum wind position

Side view
Substantially horizontal position

Top view
Natural maximum wind position

Top view
Substantially horizontal position

Perspective, rotation angle 2

Perspective, rotation angle 3

Perspective, rotation angle 5

Perspective, rotation angle 6

Perspective, rotation angle 7

Perspective, rotation angle 8

Perspective, tilt angle and rotation angle 1

Perspective, tilt angle and rotation angle 2

Perspective, tilt angle and rotation angle 3

Perspective, tilt angle and rotation angle 4

100

Perspective, tilt angle and rotation angle 5

Perspective, tilt angle and rotation angle 6

Perspective, tilt angle and rotation angle 7

WIND TURBINE WITH AUTOMATIC TILTING FRAME FOR UNLOADING DAMAGING WINDS ENCOUNTERED BY WIND TURBINES

CROSS REFERENCE TO RELATED APPLICATIONS

The instant application claims priority to U.S. Provisional Application 61/934,191 filed Jan. 31, 2014 entitled Automatic tilting frame for unloading damaging winds encountered by wind turbines, the contents of which are expressly incorporated by reference herein in its entirety. The instant application also relates to U.S. patent application Ser. No. 12/461,719 filed Aug. 21, 2009, the contents of which are expressly incorporated herein by reference.

FIELD OF THE INVENTION

The various embodiments described herein relate generally to a frame for a wind turbine. More particularly, the embodiments relate to a frame for a wind turbine that allows the turbine to rotate about a horizontal tilt axis to offset the influence of high hinds.

BACKGROUND

Modern, wind-driven electricity generators were born in the late 1970's. Until the early 1970s, wind energy filled a small niche market supplying mechanical power for grinding grain and pumping water, as well as electricity for rural battery charging. With the exception of battery chargers and rare experiments with larger electricity-producing machines, the windmills of 1850 and even 1950 differed very little from the primitive devices from which they were derived. As of July 2014, wind energy provided approximately 4% of total U.S. electricity generation. Most modern wind turbines typically have multi-bladed rotors with diameters of 10-80 meters mounted atop 60-80 meter towers. Another known turbine design is known as a "rimmed" turbine, in which significantly more than three blades are mounted to an in inner hub and at their inboard end and an outer rim at their tips. This type of turbine has been used extensively in rural farming for pumping irrigation water for decades. In both cases, the blades can extend substantially equidistantly around the axis of rotation. Each blade has an aerodynamic shape selected to exert a rotational torque in the presence of wind that rotates the blade about an axis of rotation at the geometric center. The blades are shaped to cause this rotation in response to a prevailing wind moving generally parallel to the axis of rotation.

The relationship between wind speed and forces on the mechanical components are based on a relationship of $y=x^3$. Thus, relative to the stress caused by a 15 mph wind, a 30 mph wind induces 8 times more stress, a 60 mph wind causes 64 times more stress, and a 120 mph wind causes 512 times more stress. Certification of a wind turbine in Hawaii requires that they must be able to withstand occasional hurricane force winds and must be 512 times as strong as a wind turbine would need to be if it only encountered an average wind speed equal to 15 mph, or roughly category 3 hurricane levels. Prior art wind turbines either (a) must be therefore significantly overbuilt to withstand damaging storm winds that occur during a very small percentage of their useful life, or (b) are limited to impractical placement in the very few geographical areas that will not experience damaging winds.

The prior art includes various designs to change the orientation of the blades relative to the wind to reduce that stress. For example, Applicants' US Patent Publication 2010-0140949 shows a design where the individual blades can be retracted into a closed position. U.S. patent application Ser. No. 12/461,719 incorporated herein shows a design in which the enter wind turbine is simply moved into a horizontal plane where the blades do not face into the wind.

BRIEF DESCRIPTION OF THE DRAWINGS

Various embodiments in accordance with the present disclosure will be described with reference to the drawings, in which:

FIG. 14 illustrates the embodiment of FIG. 1 in a particular rotation and pitch position.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Embodiments of the instant application are directed to a tilting frame for horizontal axis wind turbines that mitigate the damaging forces of wind velocities that would cause damage to the turbines and the structures they are mounted to. The design can meet certification standards using only one third the structural strength or less of the mass and cost of the typical prior art commercial turbine.

FIGS. 1-41 show a wind turbine assembly 100 according to an embodiment of the invention. Each of FIGS. 1-41 show a different view and/or orientation of the wind turbine assembly 100 based on ambient conditions. Various figures are referred to herein to describe aspects of the embodiment to the extent that those aspects may be optimally visible from the particular view/orientation of a particular figure, but all views show in FIGS. 1-41 are the same embodiment.

For purposes of reference, the face of the wind turbine assembly 100 that faces into the incoming wind is referred to herein as the front side, and the opposite face is referred to herein as the rear side. Similarly, the direction pointing forward from the front side into the wind is the forward direction, and the direction point rearward from the rear side is the rear direction Referring now specifically to FIGS. 1 and 42, wind turbine assembly 100 includes a wind turbine 101 with a plurality of blades 102 mounted on a central hub 104 that rotates under wind force. A motor (electric generator) 4202 within hub 104 for external thereto) is driven by the rotation and generates electricity via cables 4204 as a result thereof. In the embodiment shown in FIG. 1 the turbine 101 is consistent with that shown in U.S. patent application Ser. No. 12/461,719, although the invention is not limited to any particular turbine architecture.

Figure 1:
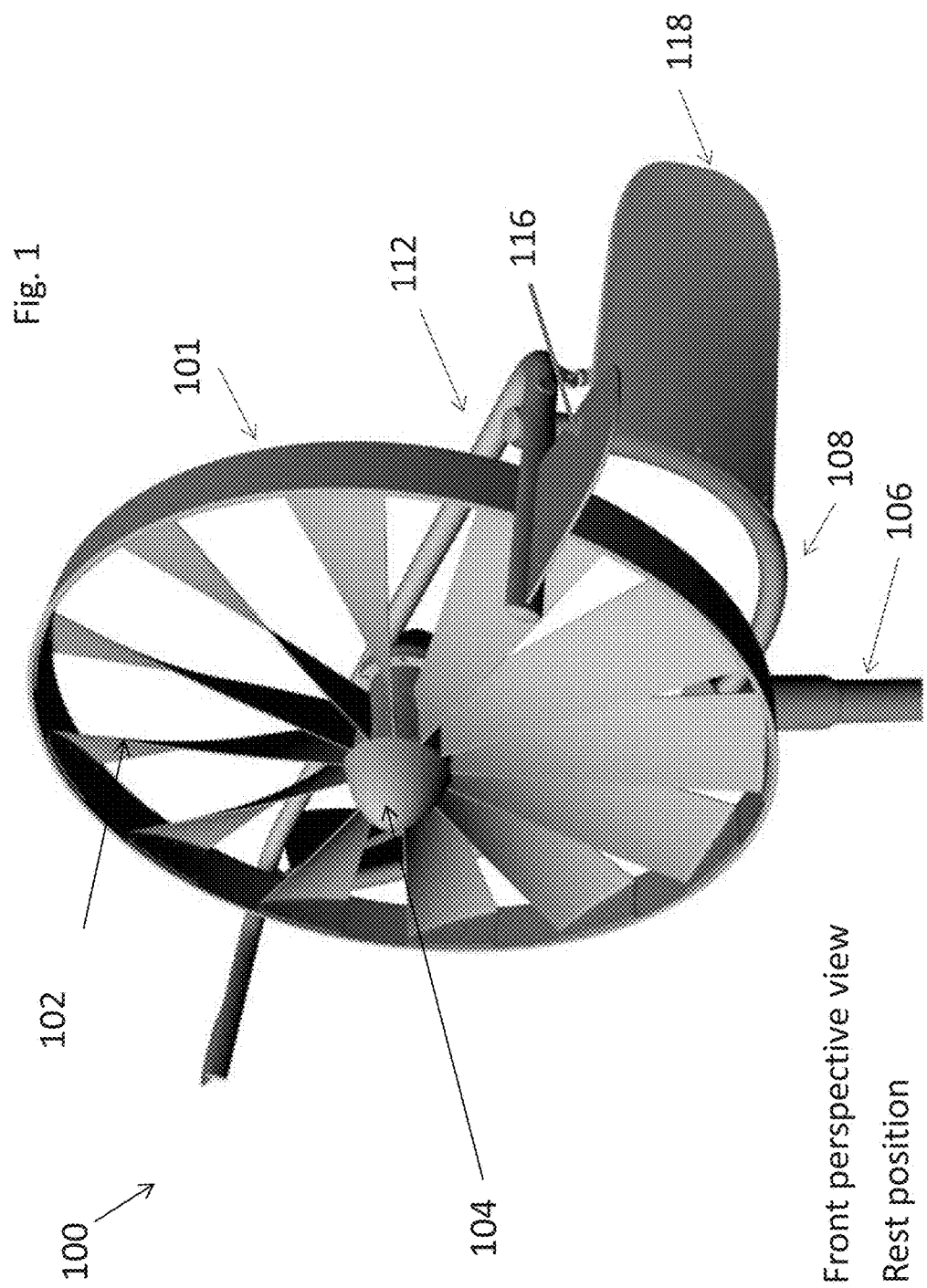
FIG. 1 illustrates a front perspective view of an embodiment of the invention at rest or under minimal wind conditions.
Figure 11:
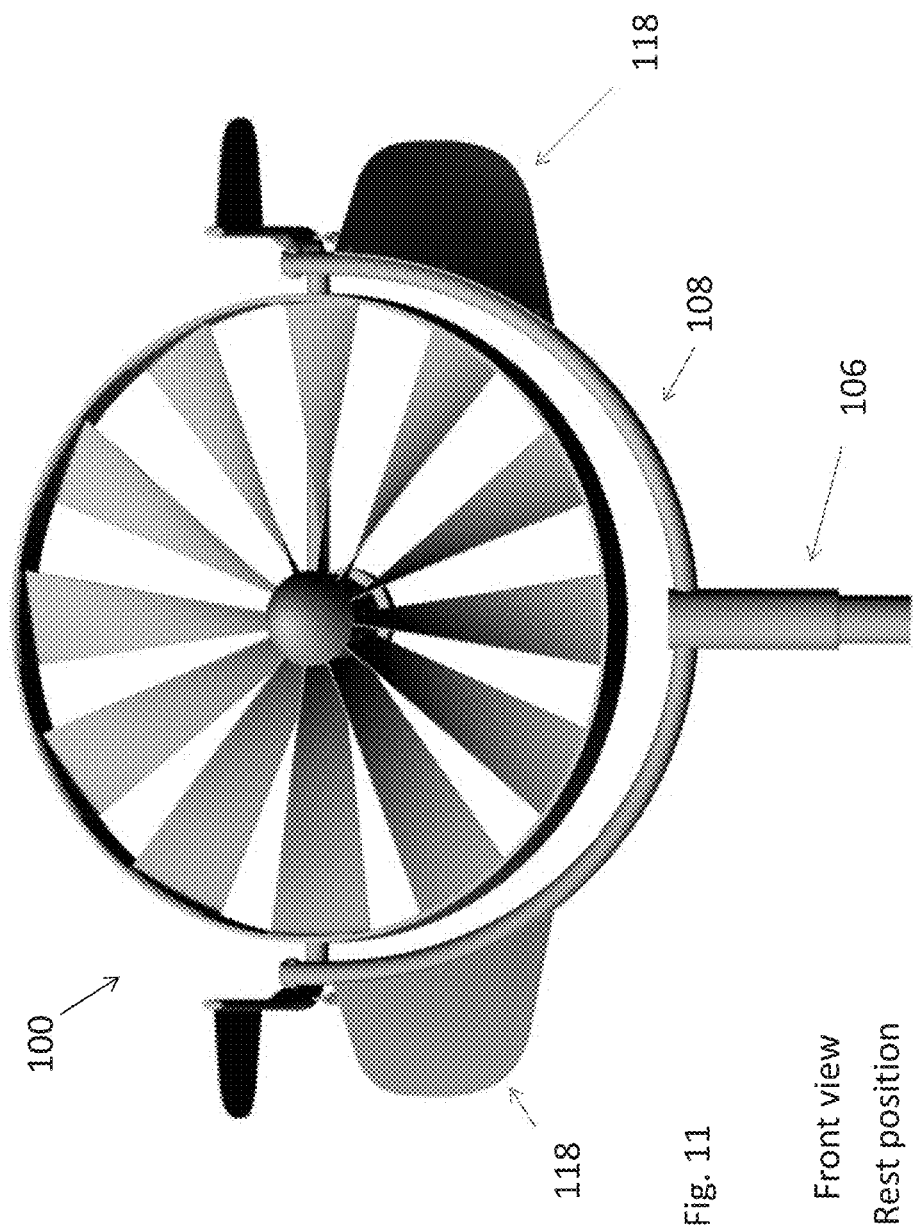
FIG. 11 illustrates a front perspective view of an embodiment of the invention at rest or under minimal wind conditions.
Figure 12:
FIG. 12 illustrates the embodiment of FIG. 11 in a higher wind orientation compared to FIG. 1.
Figure 13:
FIG. 13 illustrates the embodiment of FIG. 11 in a higher wind orientation compared to FIG. 2.
Figure 14:
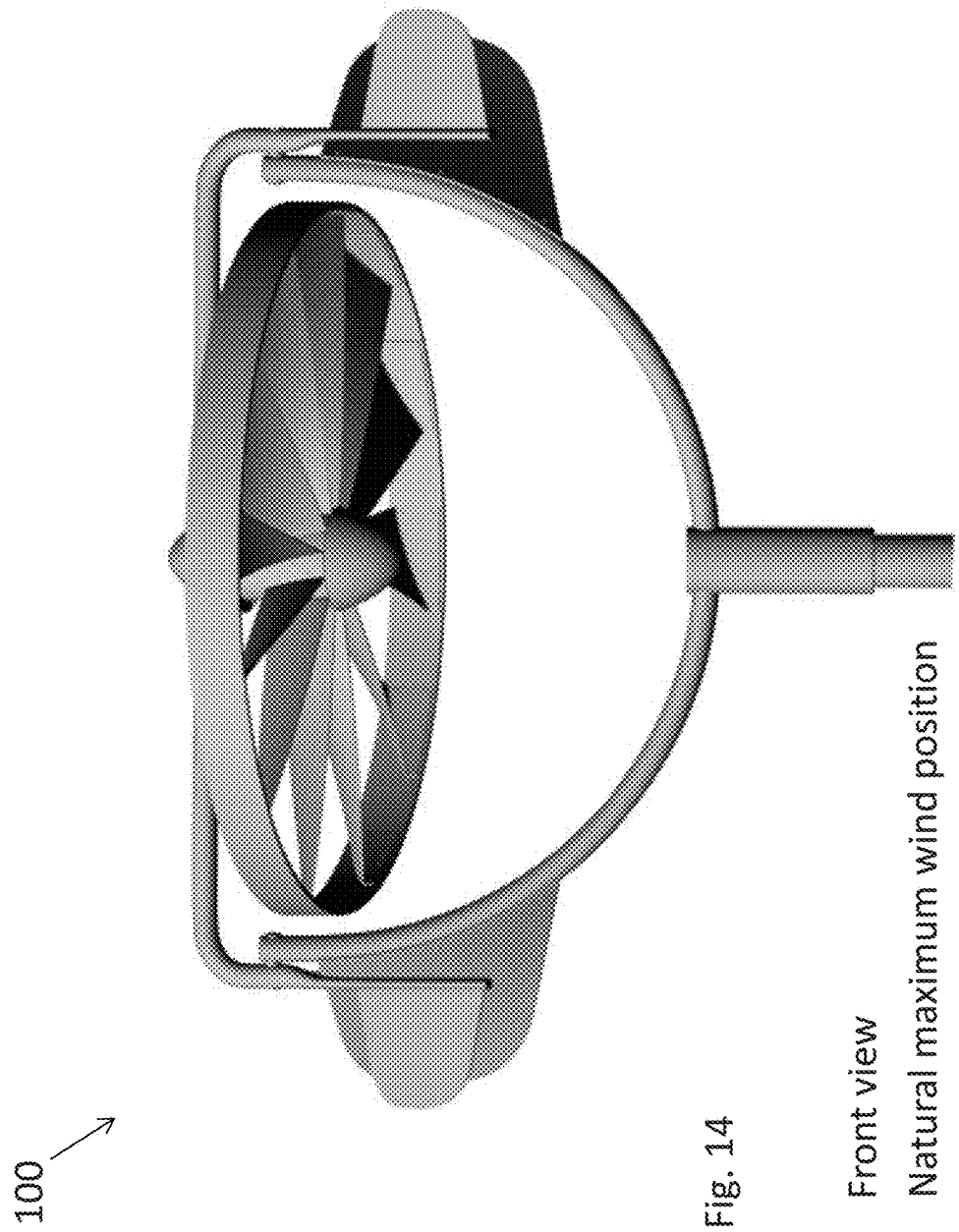
FIG. 14 illustrates the embodiment of FIG. 11 in a higher wind orientation compared to FIG. 3.
Figure 15:
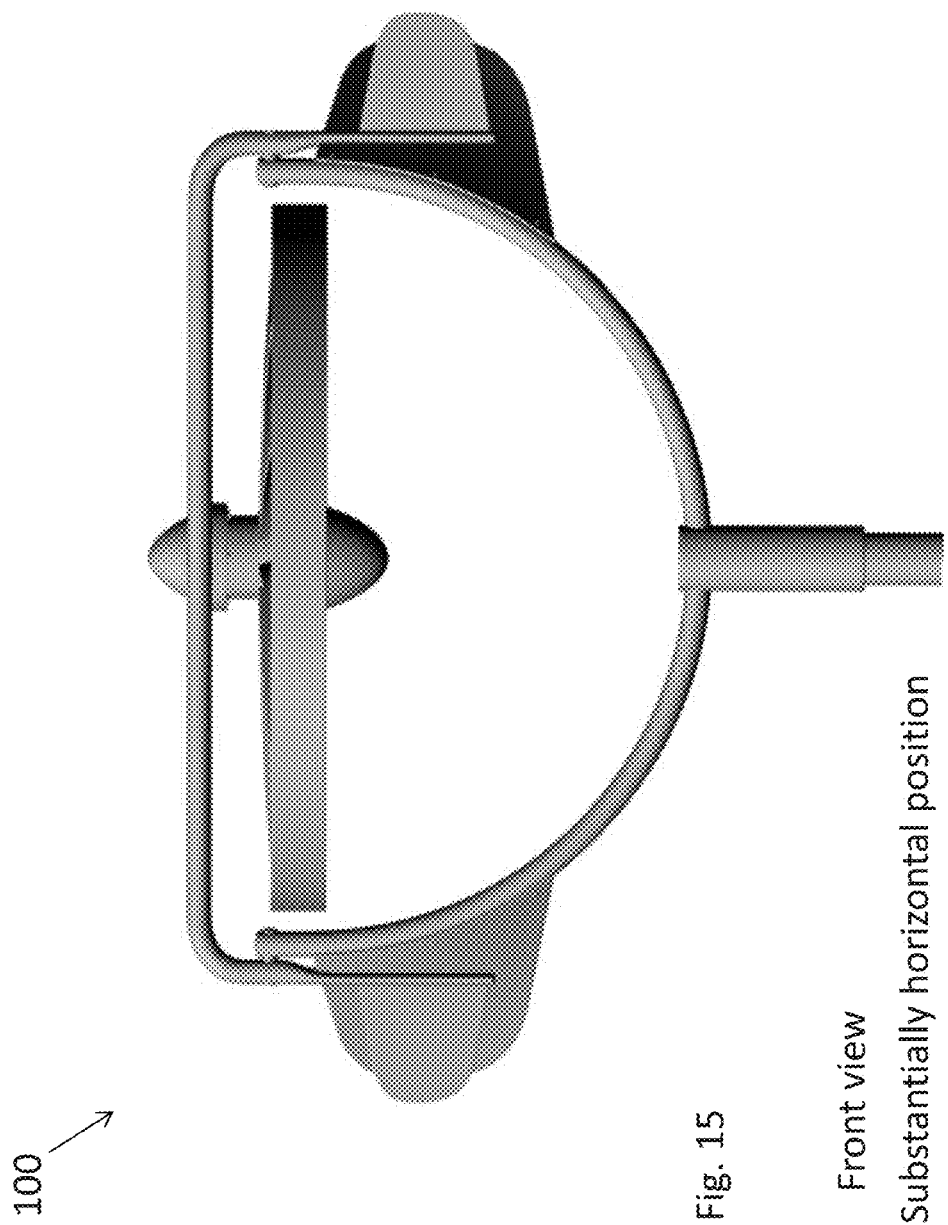
FIG. 15 illustrates the embodiment of FIG. 11 in a substantially horizontal position.
Figure 16:
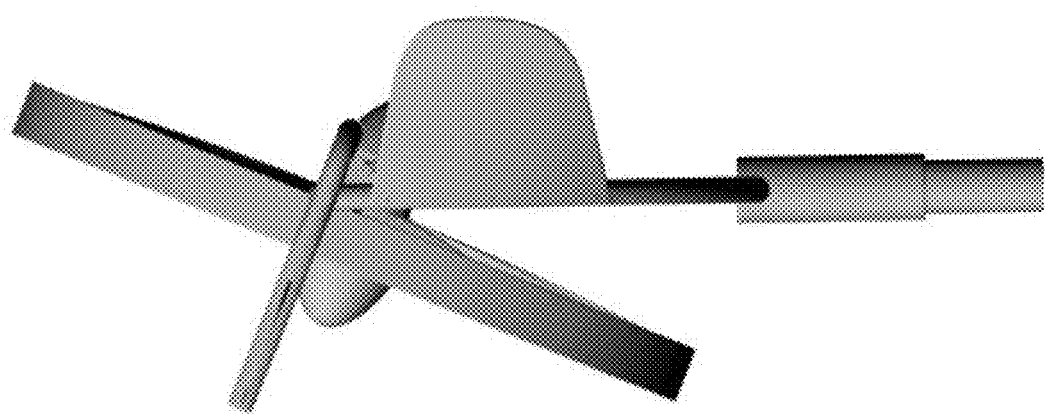
FIG. 16 illustrates a rear perspective view of an embodiment of the invention at rest or under minimal wind conditions.
Figure 17:
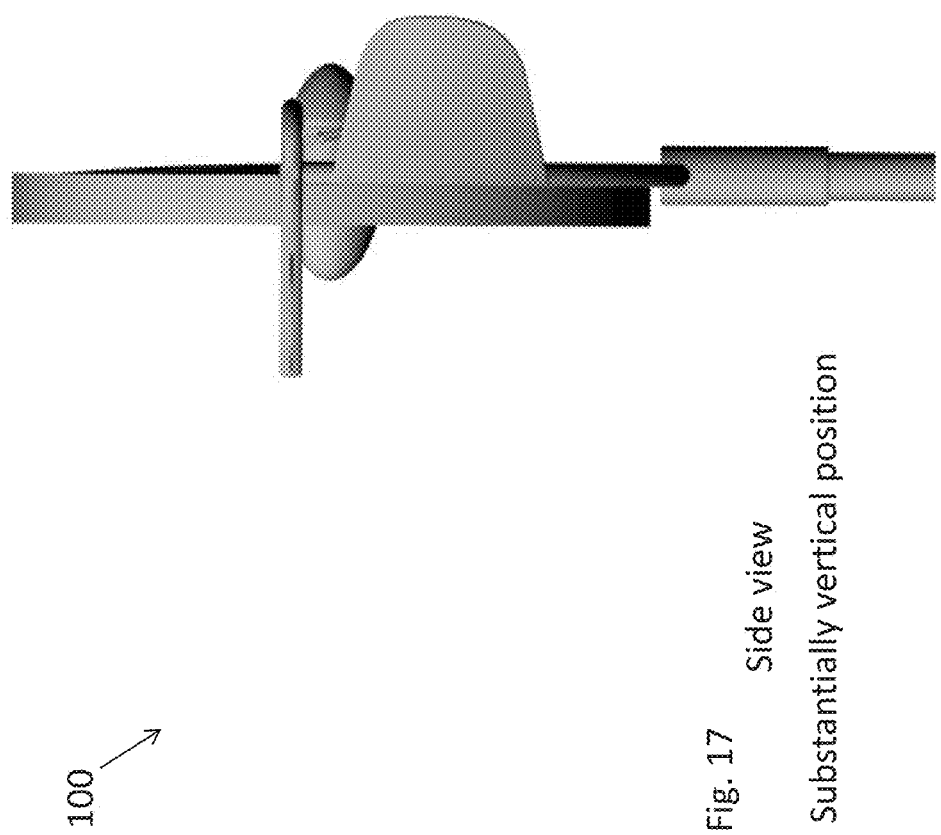
FIG. 17 illustrates the embodiment of FIG. 16 in a higher wind orientation compared to FIG. 16.

Referring now to FIGS. 1 and 11, a support structure mounts the turbine 101 in the air. The support structure includes a mast 106 that supports a yoke 108 rotatably mounted on the mast 106. The mast is preferably directly or indirectly anchored to the ground or some ground based support in a known manner that is not further described herein. The yoke 108 has two arms in a generally curved or Y shape to receive and encircle from beneath the turbine 101. Preferably an equidistant gap is provided between the turbine 101 and the yoke 108, but this need not be the case. In the alternative, other non-limiting shapes could be used as the yoke 108, such as a U-shape, a circle, a square, etc. Two arms are shown, but the invention is not limited thereto, and even a single arm may be used. The invention is not limited to any particular design of the mast 106 or yoke 108.

Yoke 108 may support one or more fins 118 that are aerodynamically shaped to engage incoming wind to urge yoke 108 to rotate about mast 106 to align turbine 101 with the oncoming wind.

Referring now to FIGS. 1, 6, 22, 36 and 37, a U-shaped cross bar 110 includes a base 112 and arms 114. Base 112 connects to hub 104 on the rear end of the turbine 101. Arms 114 of the U-shaped cross bar pivotally connect to the yoke 108 to support the turbine 101. Arms 114 may further extend pass the yoke 108, and may terminate in paddles 116. Cross bar 110 need not be limited to a U shape, and other shapes could be used. Similarly, it need connect on both sides of turbine 101.

Figure 2:
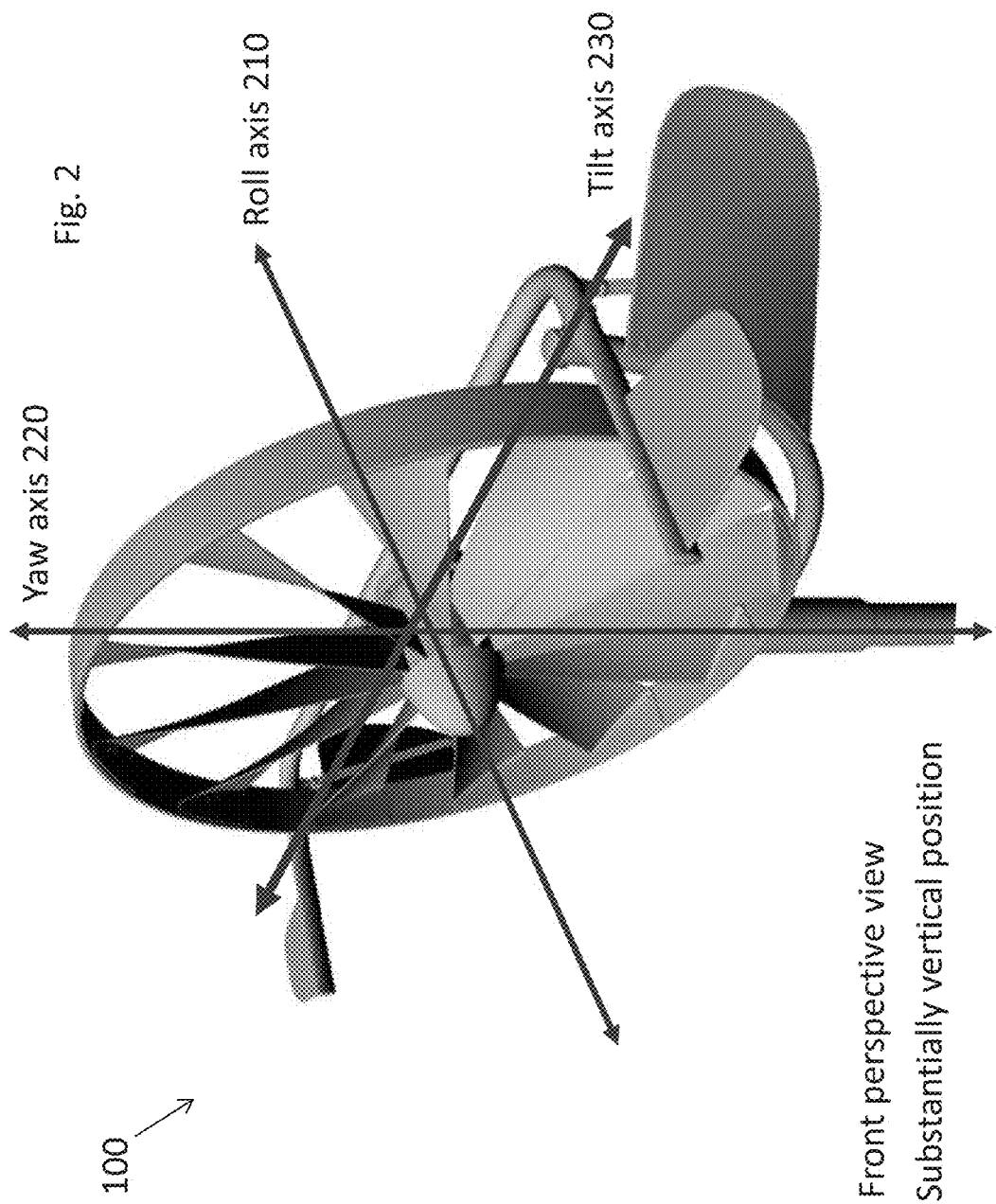
FIG. 2 illustrates the embodiment of FIG. 1 in a higher wind orientation compared to FIG. 1.

Referring now to FIG. 2, wind turbine assembly 100 has three axis of rotation. The first axis is the central axis of the hub 104 about which the blades 102 rotate defines a roll axis for the turbine 101, referred to herein as the roll axis 210. The blades 102 rotate about the roll axis 210 in a known manner to generate electricity.

The second axis is the vertical axis as set by the mast 106, referred to herein as the yaw axis 220. The turbine 101 can rotate about the yaw axis 220, potentially with the aid of fins 118, to bring the forward face of the turbine 101 into alignment with the wind, again in a known manner. FIGS. 26-32 show how turbine 101 can rotate into different rotational positions.

The roll axis 210 and yaw axis 220 are shown in the embodiments as, intersecting and perpendicular to each other, although this need not be the case.

The third axis is the axis about which the turbine 101 will pitch with respect to the incoming wind, and is referred to herein as the tilt axis 230. In the embodiments herein, the tilt axis 230 is defined by the pivot connections between the U-shaped cross bar 110 and the Y-shaped yoke 108.

Figure 7:
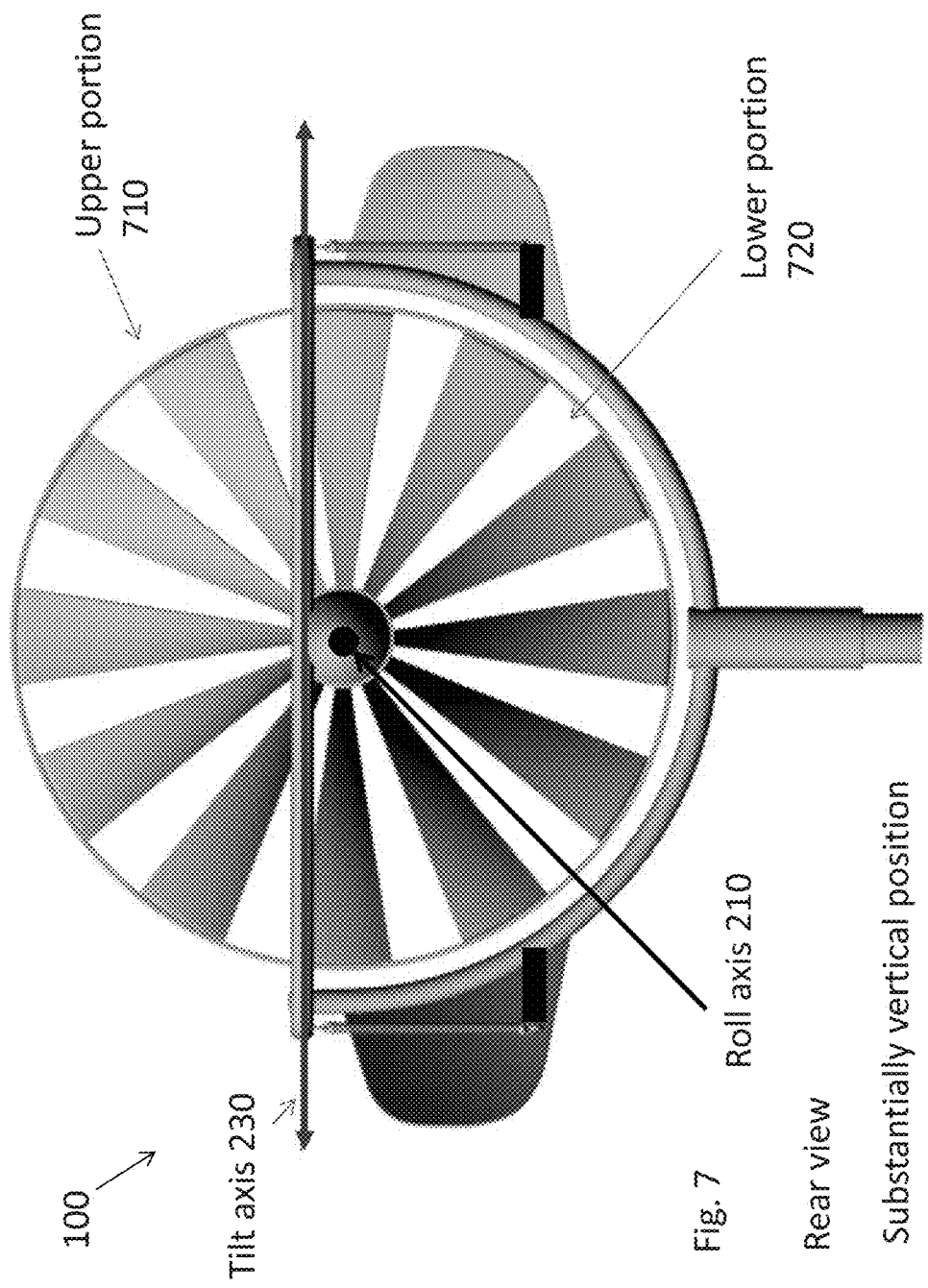
FIG. 7 illustrates the embodiment of FIG. 6 in a higher wind orientation compared to FIG. 6.
Figure 8:
FIG. 8 illustrates the embodiment of FIG. 6 in a higher wind orientation compared to FIG. 7.
Figure 9:
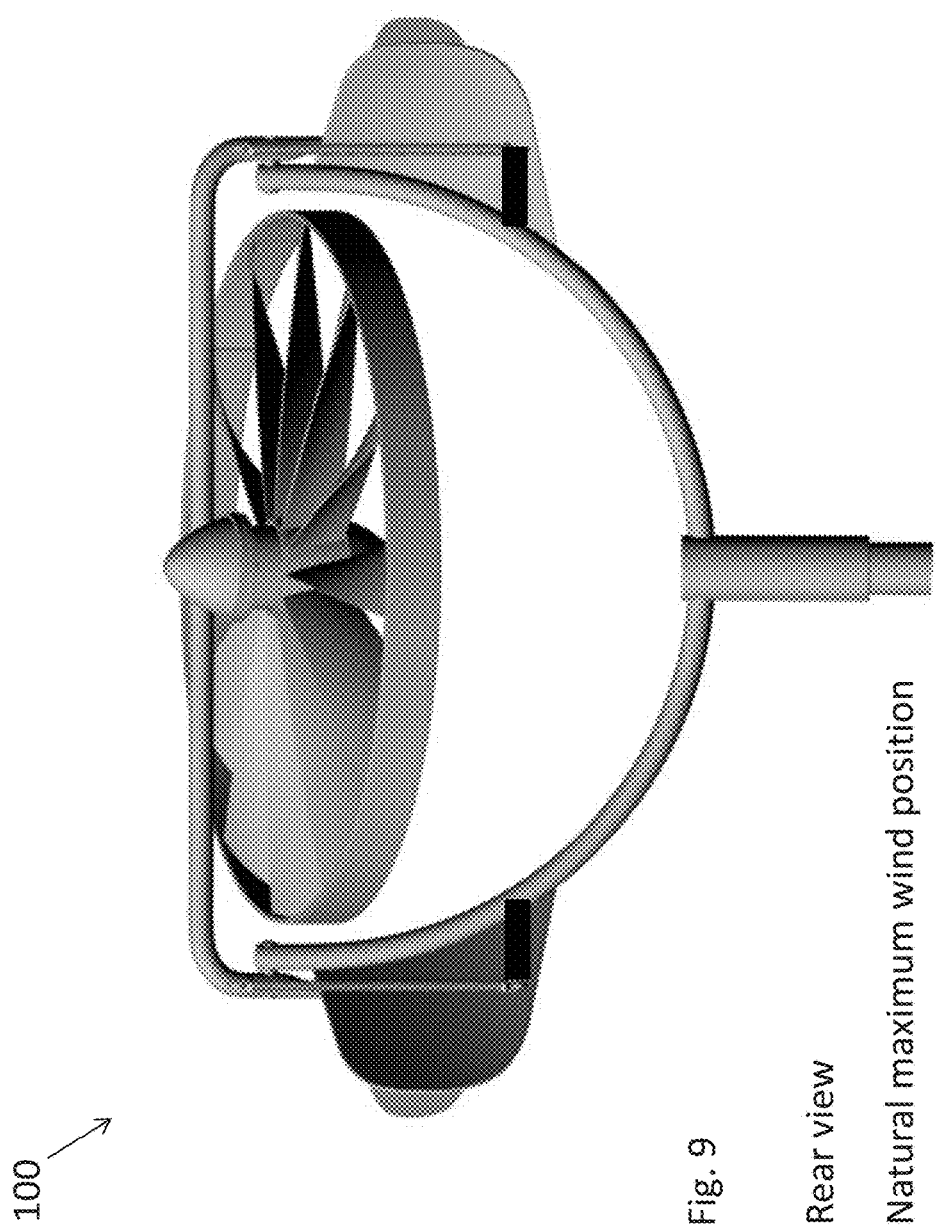
FIG. 9 illustrates embodiment of FIG. 6 in a higher wind orientation compared to FIG. 8.
Figure 10:
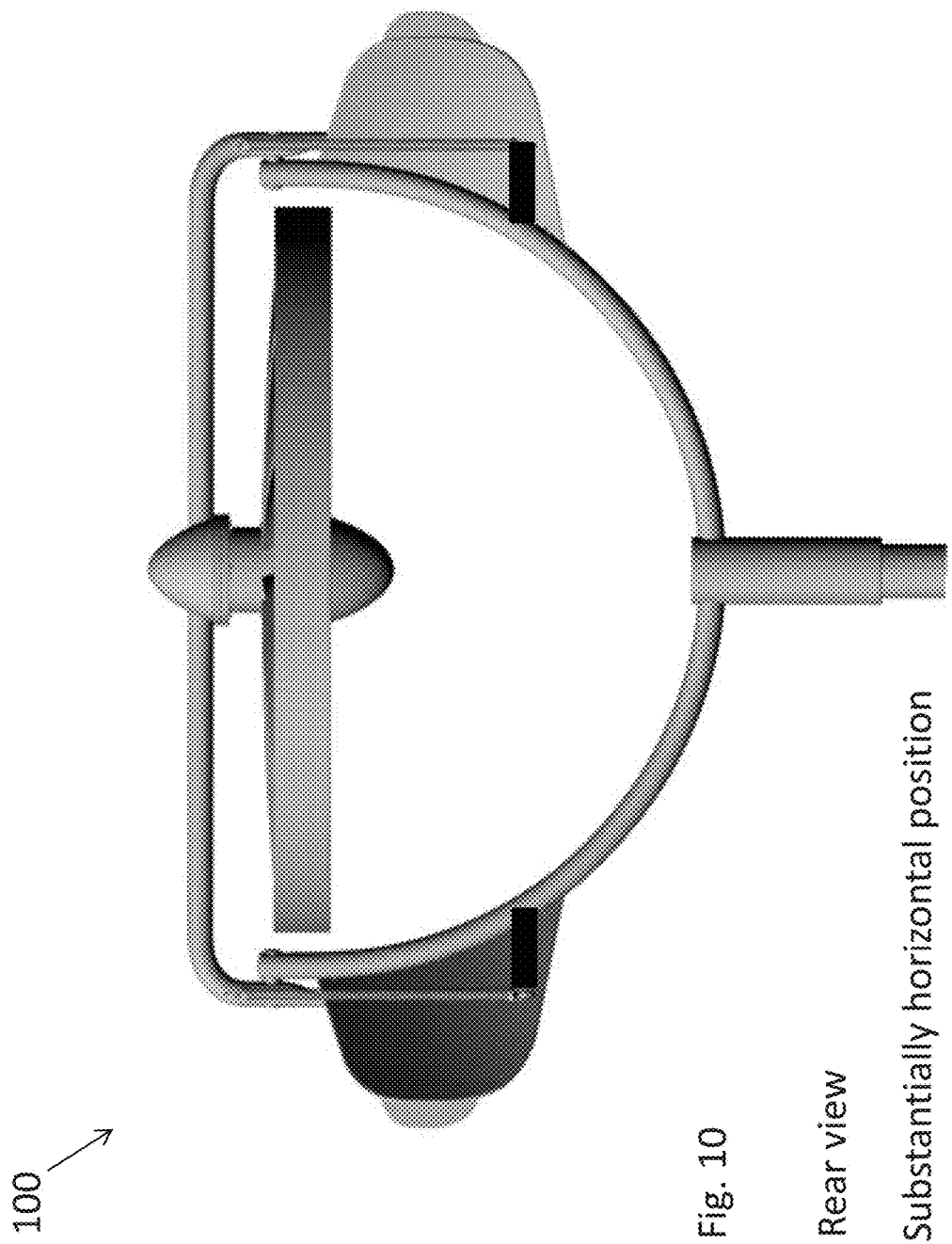
FIG. 10 illustrates the embodiment of FIG. 6 in a substantially horizontal position.

Referring now to FIGS. 2 and 7, while the tilt axis 230 and roll axis 210 are perpendicular to each other, the tilt axis 230 is vertically offset from, and preferably above, the roll axis 210. The tilt axis 230 therefore does not bisect the turbine 101 into equal halves, but instead into unequal upper portion 710 and lower portion 720 of the surface area provided by turbine 101 ("surface area" in this context referring to the area over the range of motion of the blades 102, such that a rotating arrangement of three blades about a hub would present a circular surface area). In the embodiment of the figures, the tilt axis 230 is higher than the roll axis 210, such that the upper portion 710 is smaller than the lower portion 720 incorporating less surface area of the turbine 101. This may provide gravitational assistance to hold the turbine in a substantially vertical position during normal average wind conditions but this need not be the case.

It is to be understood that "unequal" in this context does not refer to minor mechanical variances within tolerances that would occur in the mechanical creation of equality. Specifically, a mechanical attempt to split the surface area into halves would almost certainly produce some upper/lower imbalance due to accepted variance within mechanical tolerances. Such minor variation does not fall within "unequal" herein. On the other hand, unequal does not have any particular numerical limit or requirement; rather the inequality is sufficient for the wind turbine 101 to move as described herein. A 60/40 split of the portions 710,720 is a non-limiting example of an unequal distribution, but the invention could be well into the tow 50's/high 40's.

Figure 3:
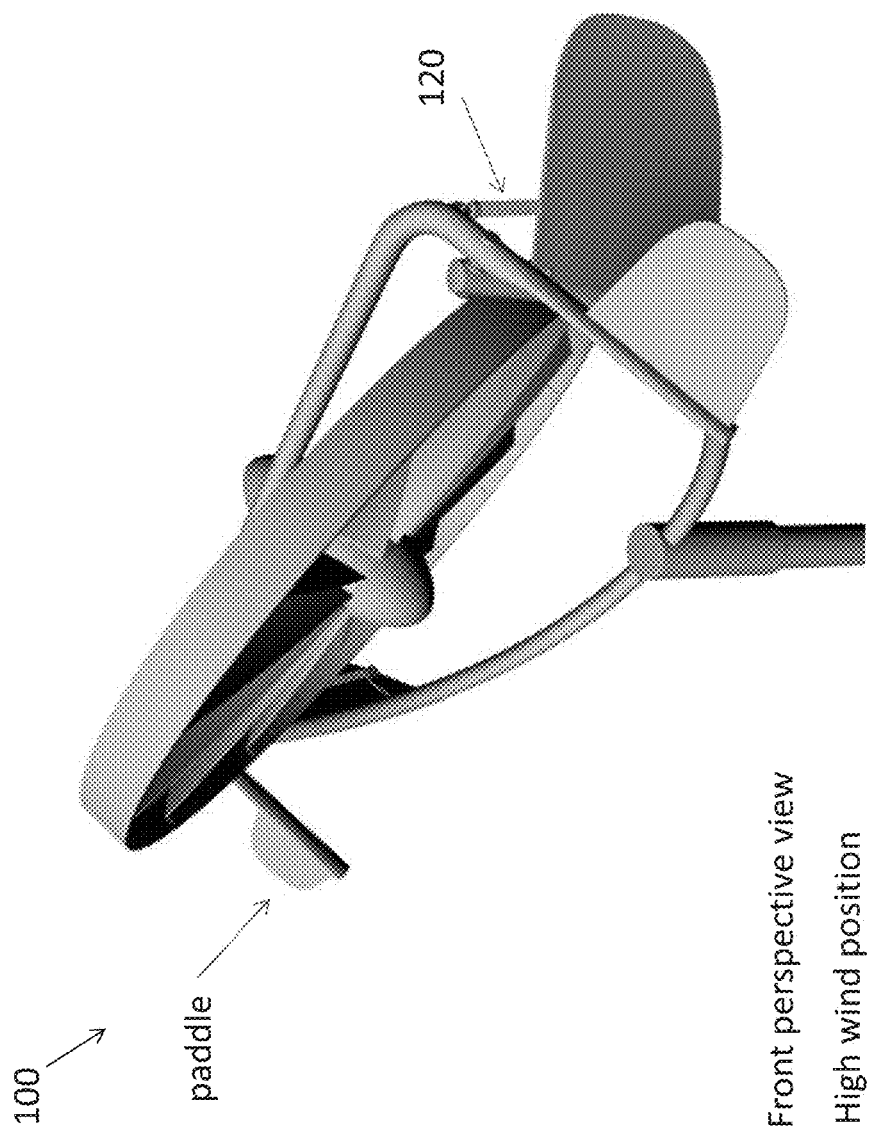
FIG. 3 illustrates the embodiment of FIG. 1 in a higher wind orientation compared to FIG. 2.
Figure 6:
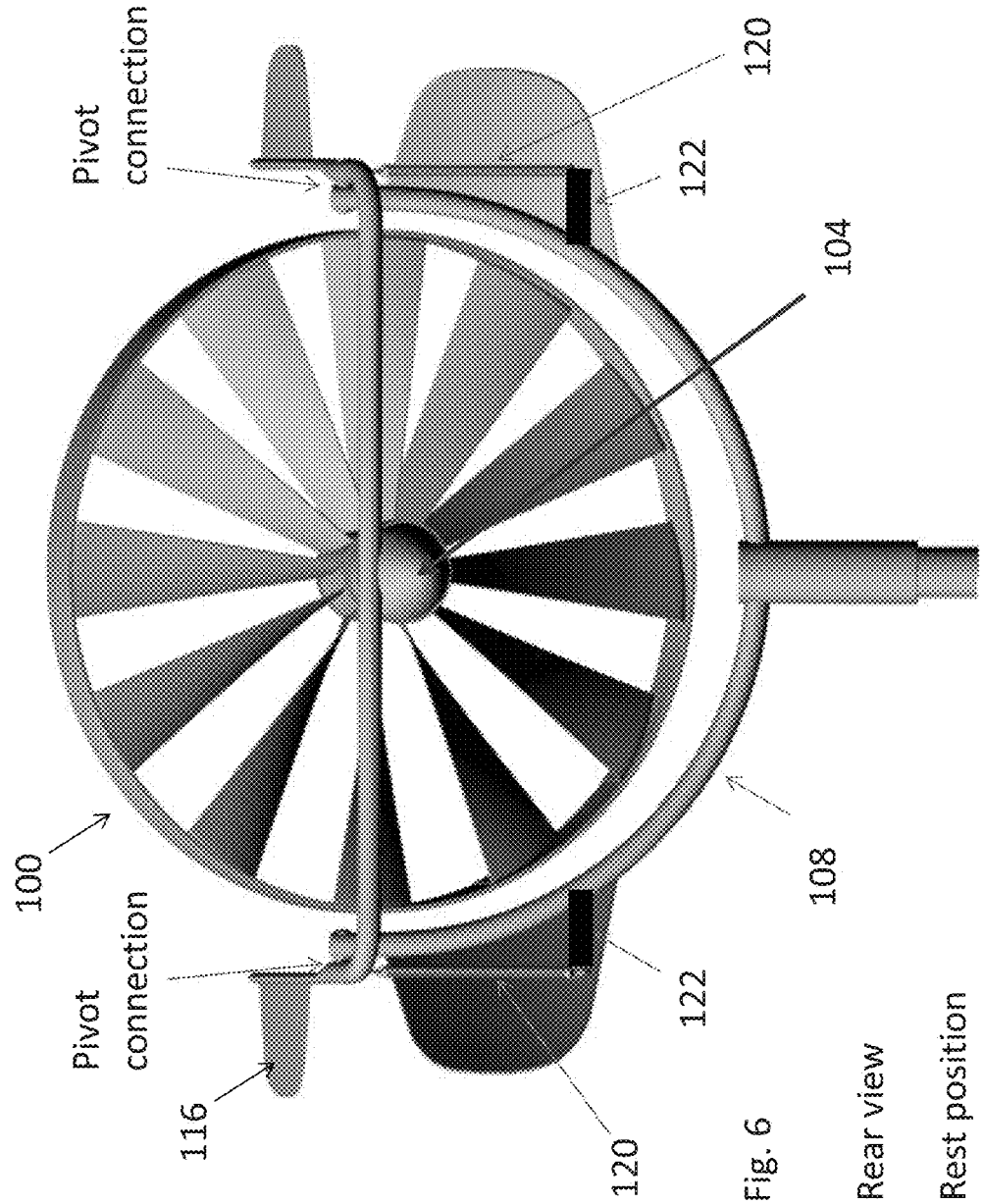
FIG. 6 illustrates a rear perspective view of an embodiment of the invention at rest or under minimal wind conditions.
Figure 28:
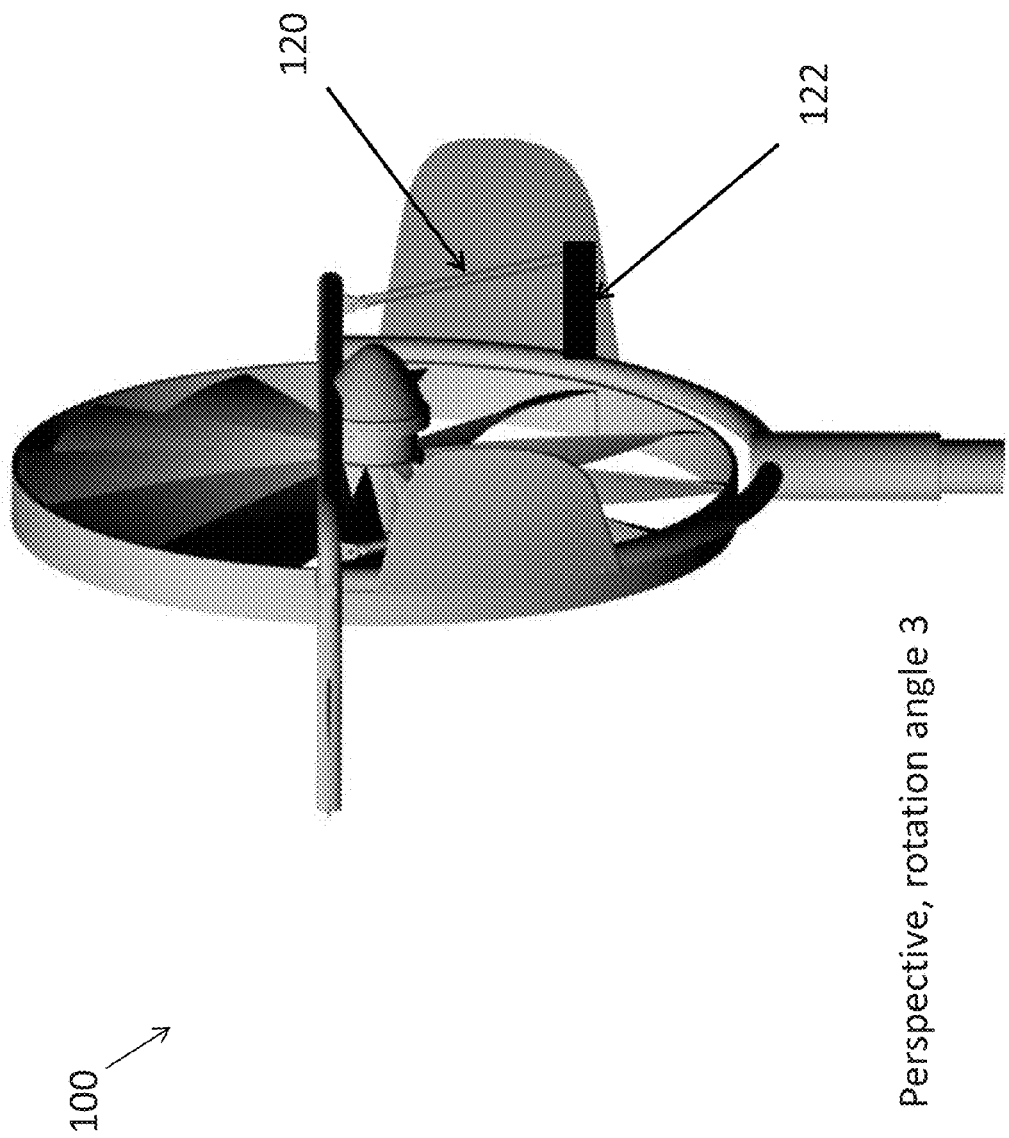
FIG. 28 illustrates the embodiment of FIG. 1 in a particular rotation and pitch position.
Figure 29:
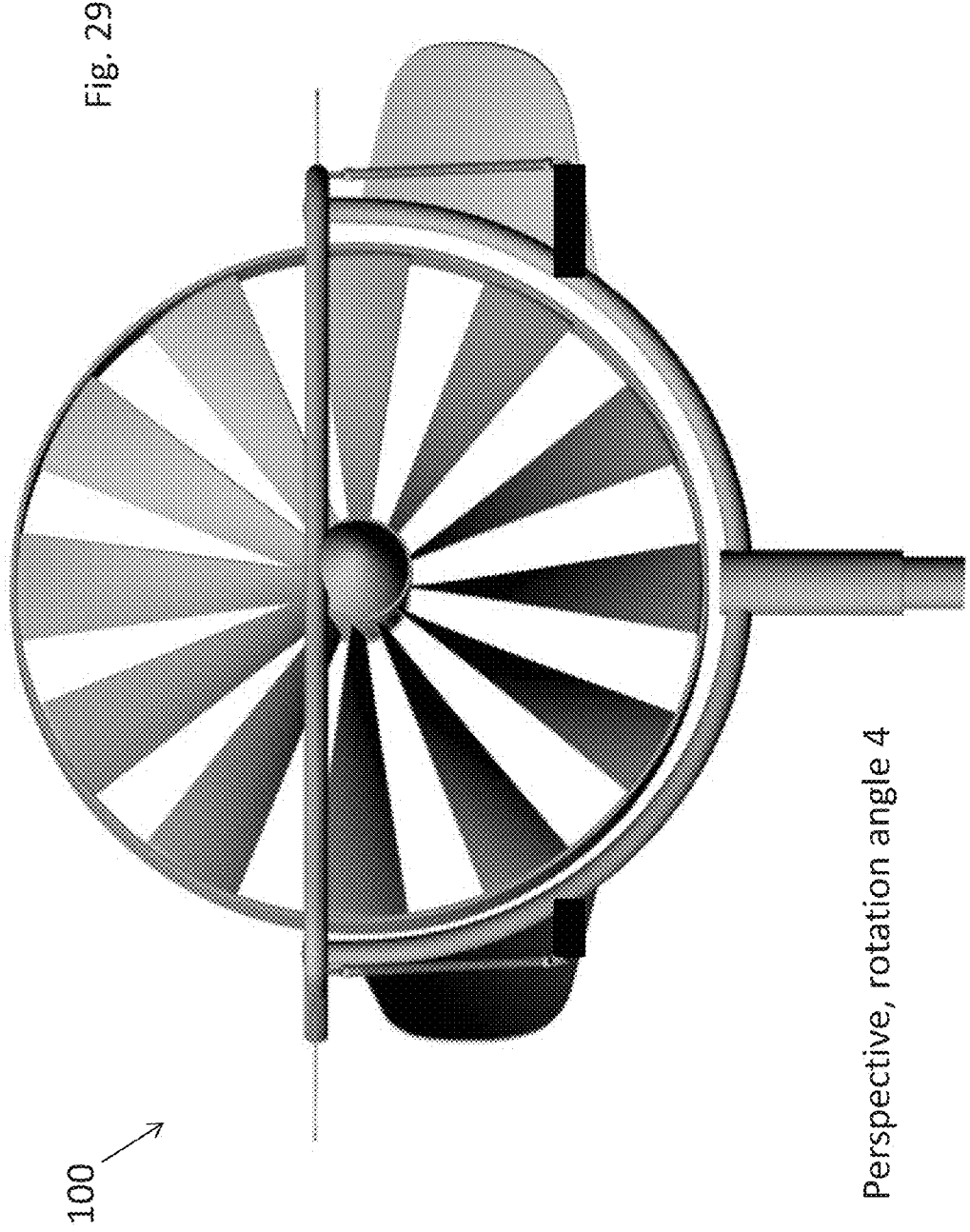
FIG. 29 illustrates the embodiment of FIG. 1 in a particular rotation and pitch position.
Figure 30:
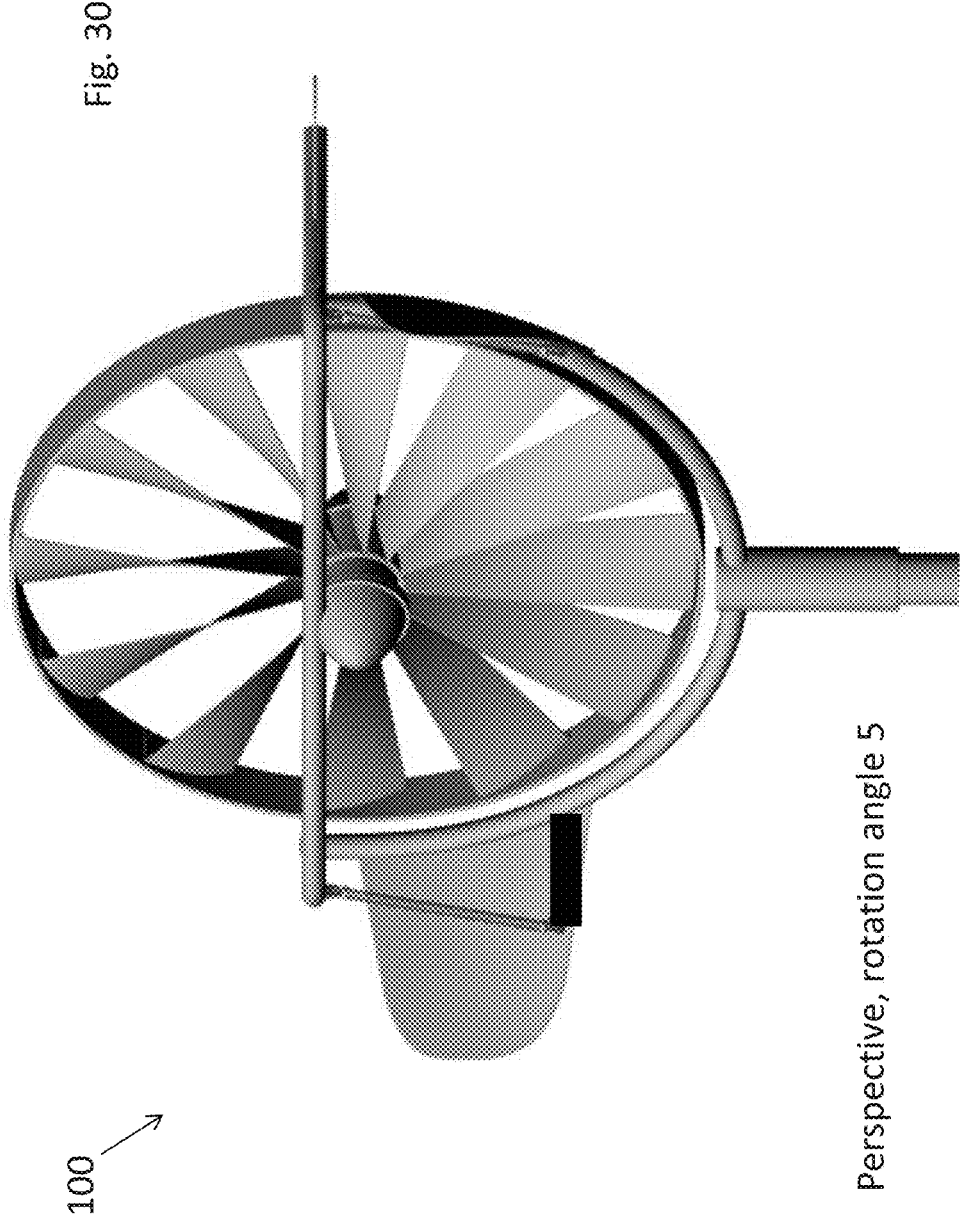
FIG. 30 illustrates the embodiment of FIG. 1 in a particular rotation and pitch position.
Figure 31:
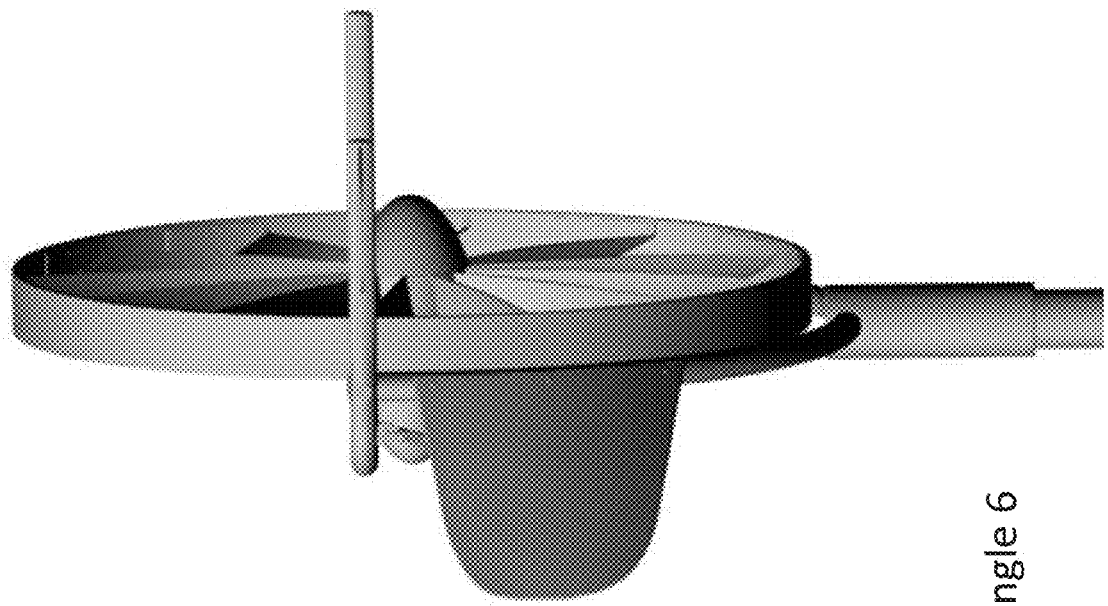
FIG. 31 illustrates the embodiment of FIG. 1 in a particular rotation and pitch position.
Figure 32:
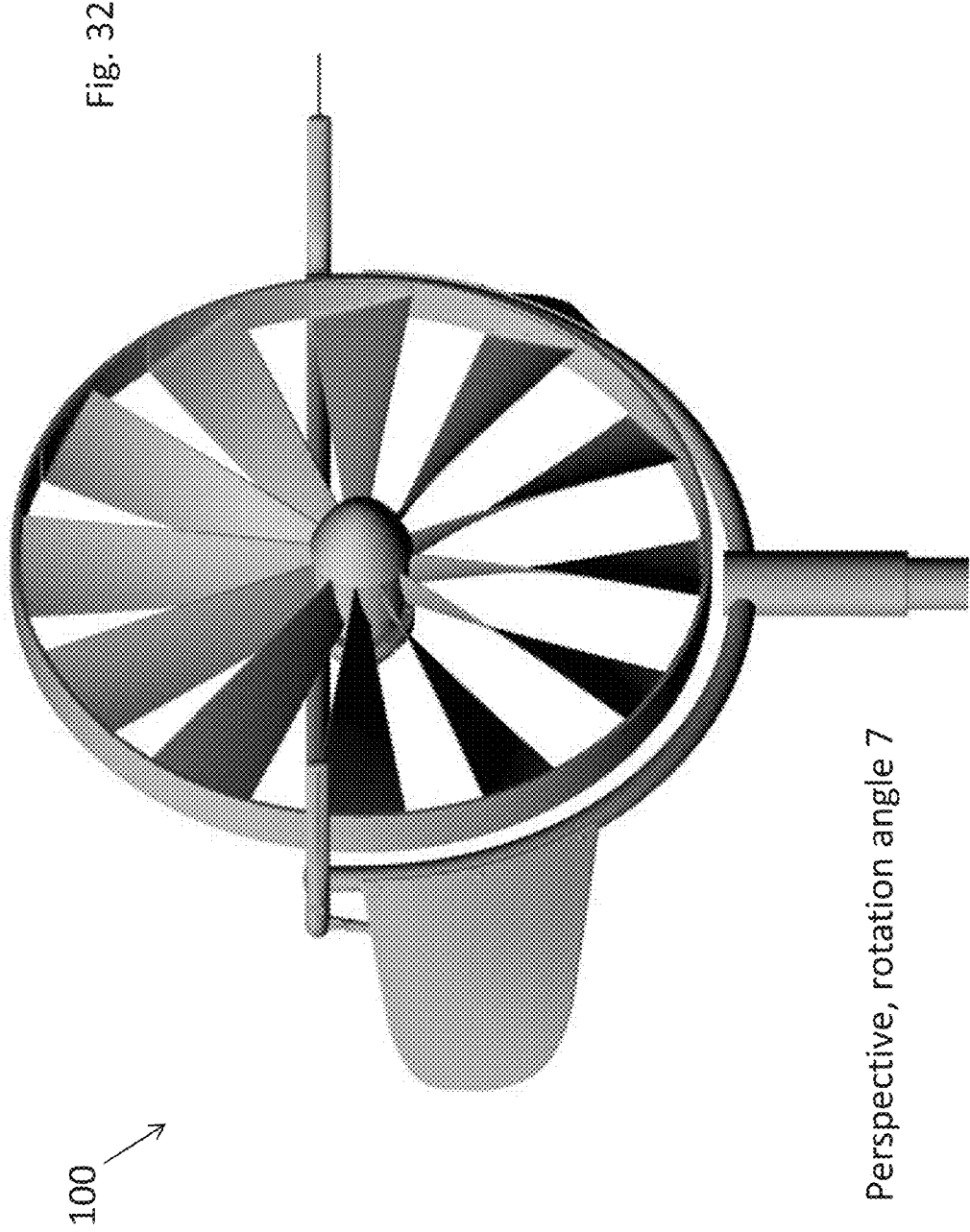
FIG. 32 illustrates the embodiment of FIG. 1 in a particular rotation and pitch position.
Figure 33:
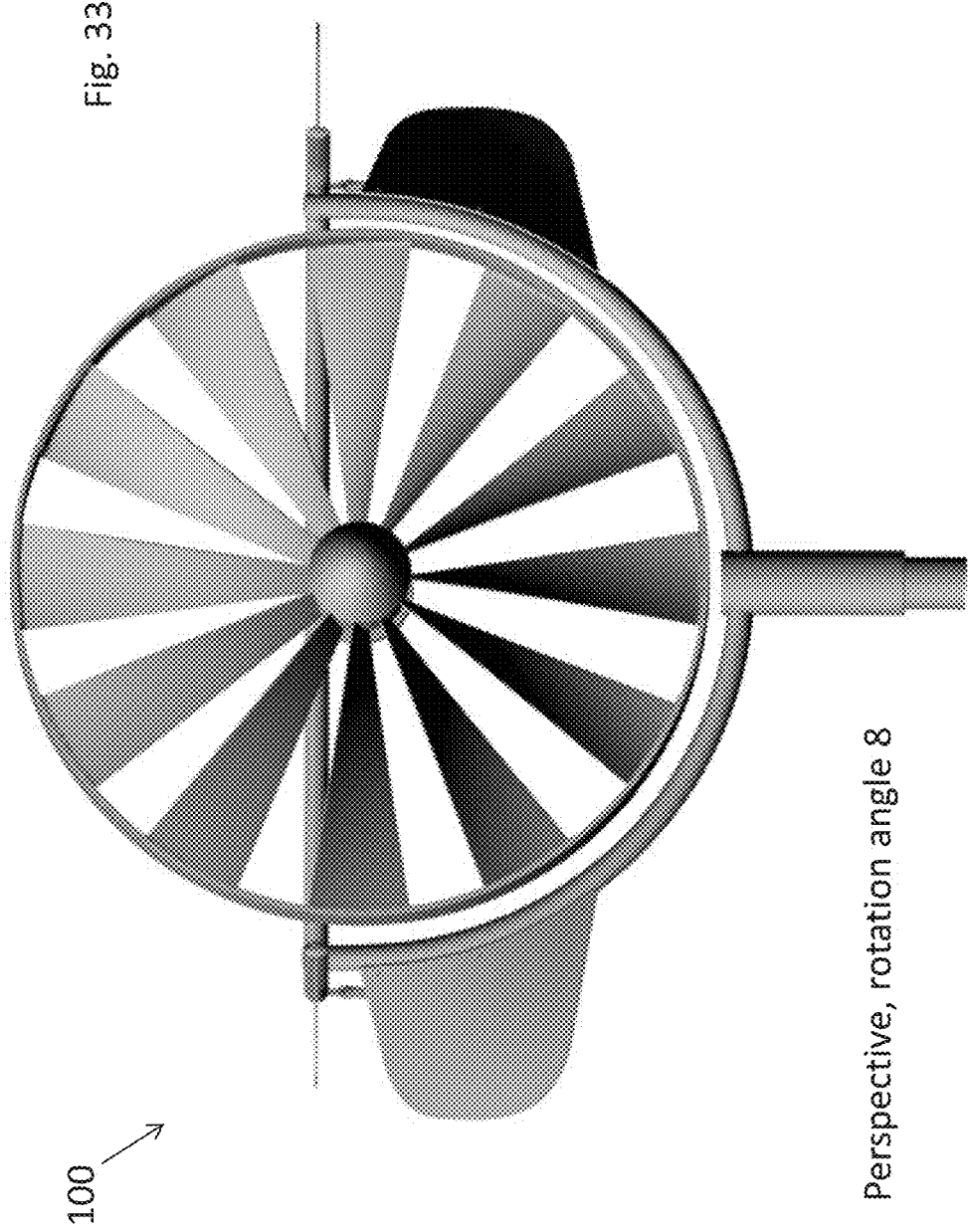
FIG. 33 illustrates the embodiment of FIG. 1 in a particular rotation and pitch position.
Figure 34:
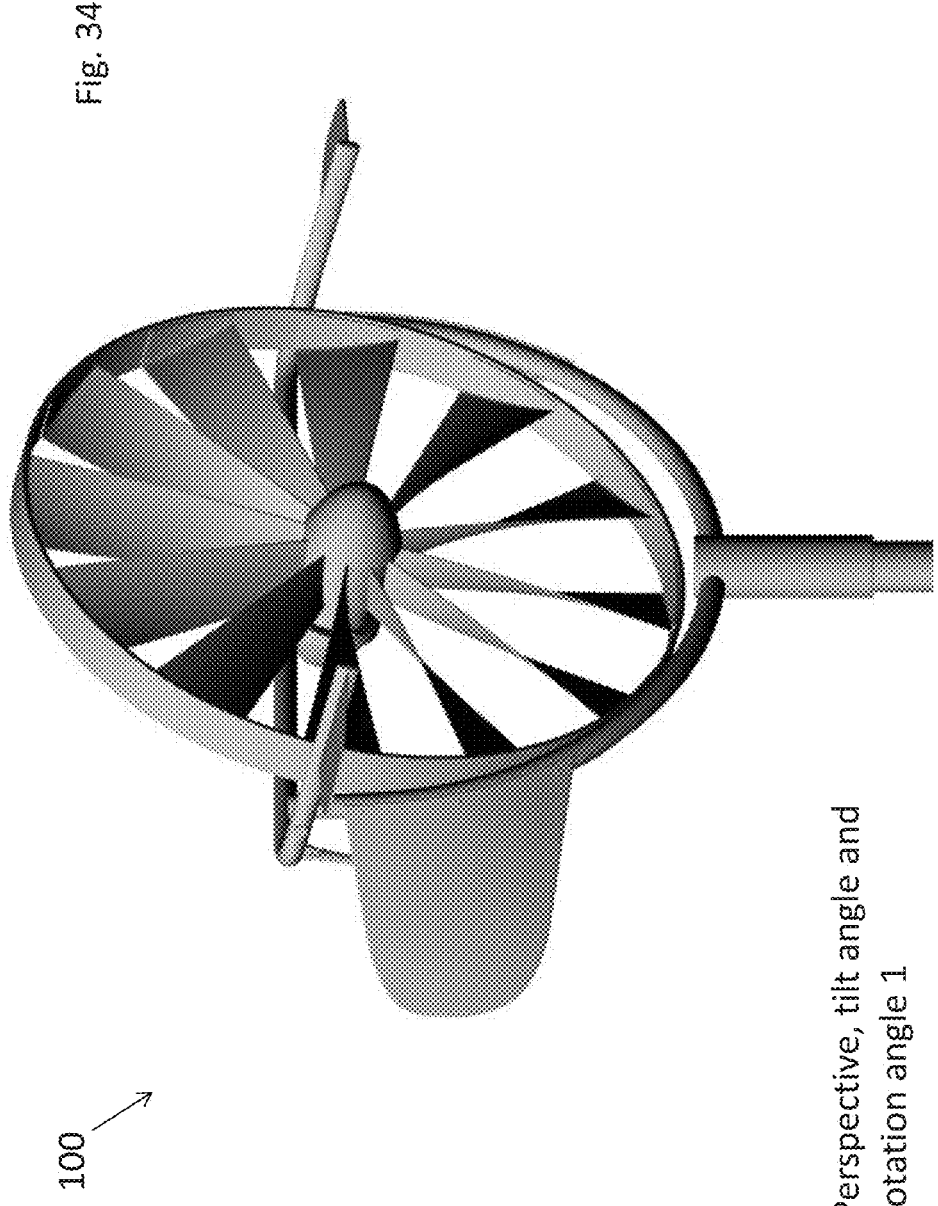
Figure 35:
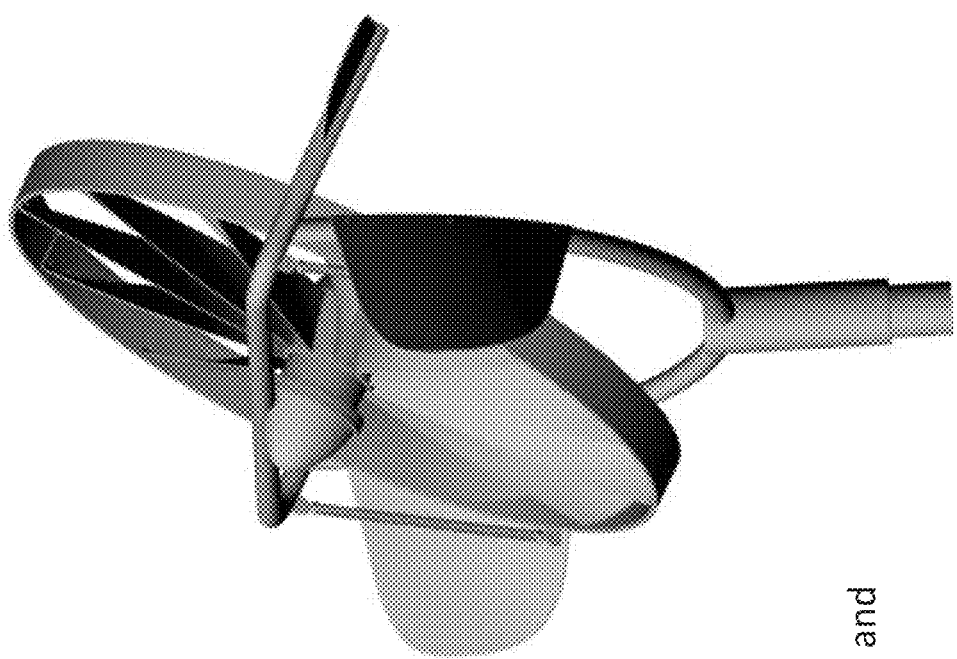
FIG. 35 illustrates the embodiment of FIG. 1 in a particular rotation and pitch position.
Figure 36:
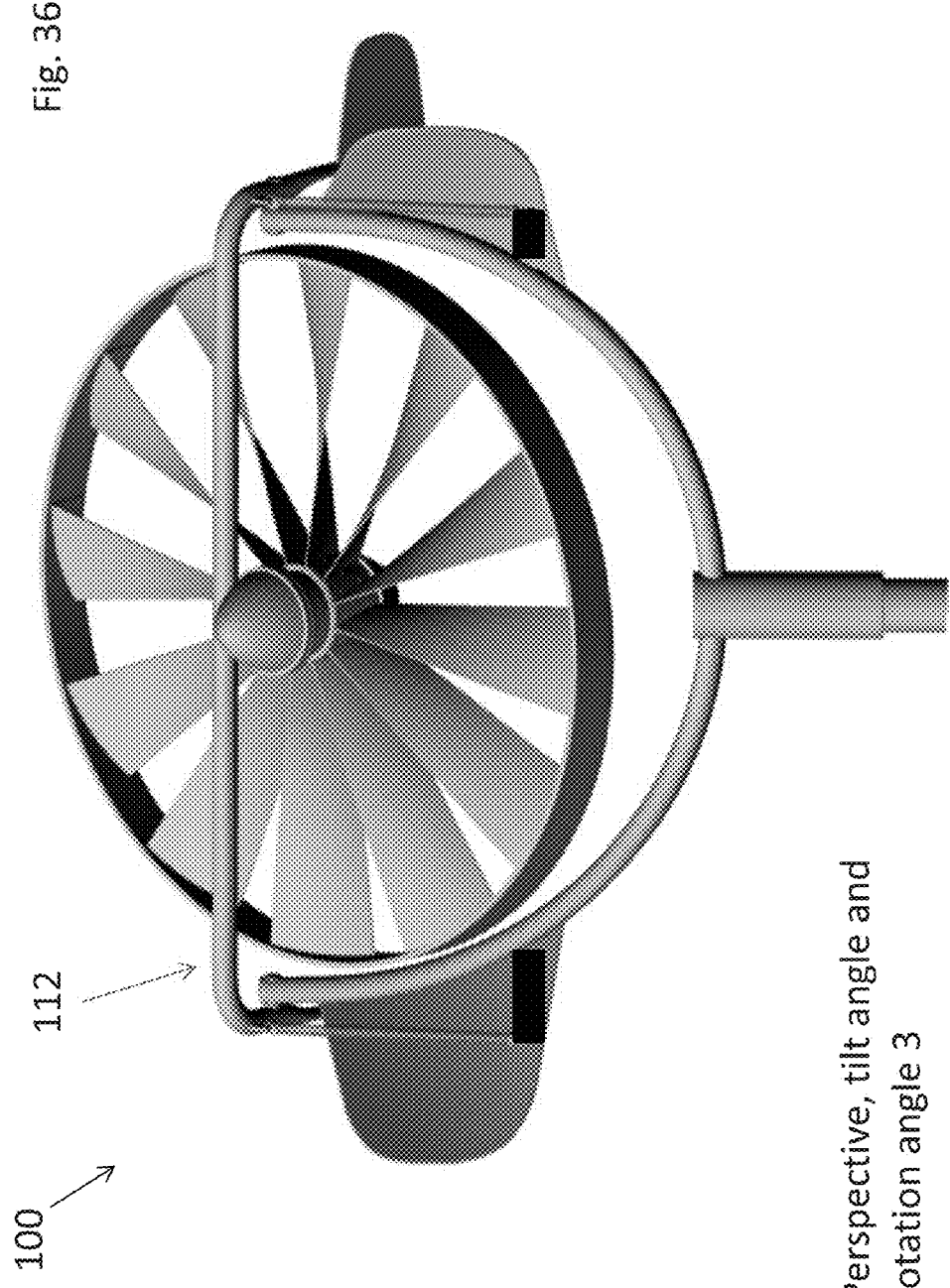
FIG. 36 illustrates the embodiment of FIG. 1 in a particular rotation and pitch position.
Figure 37:
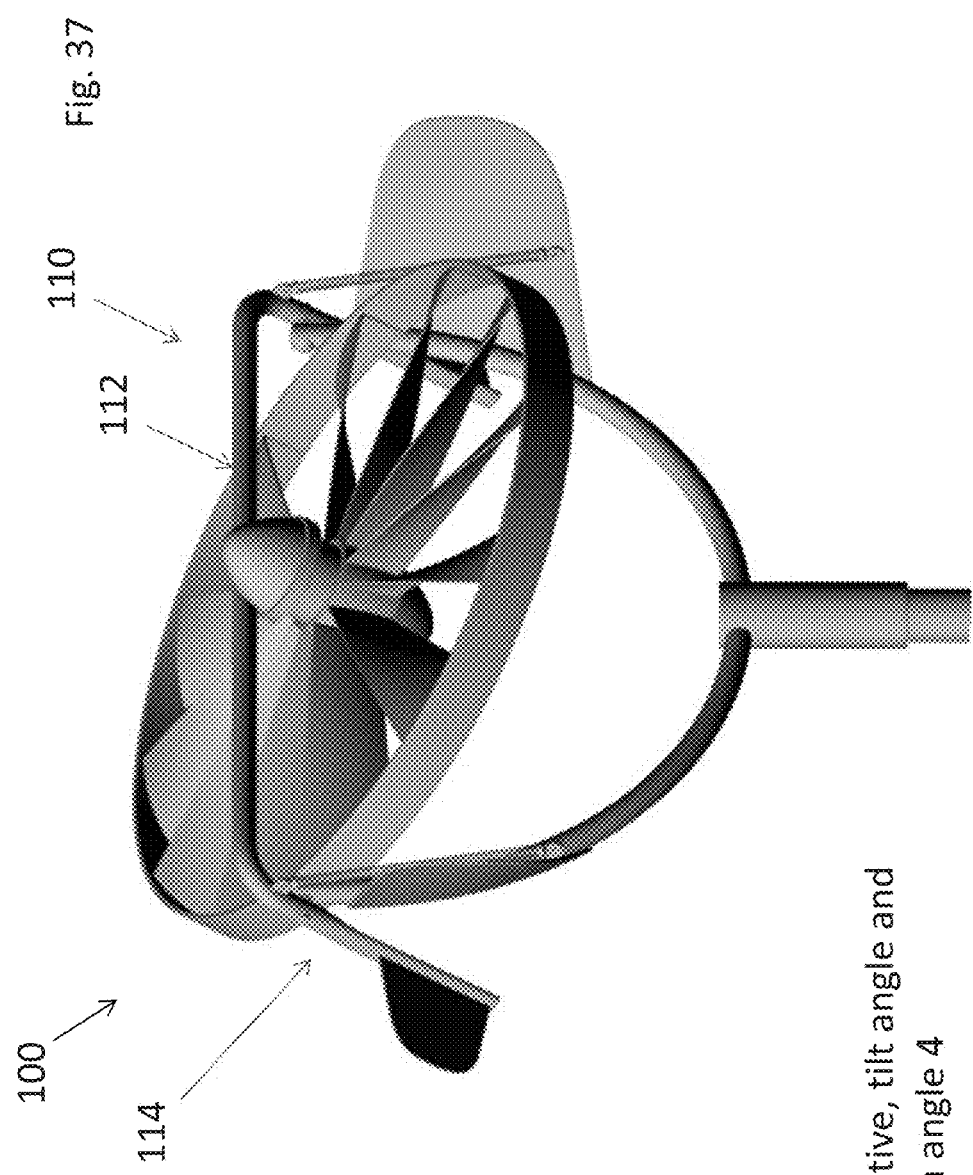
FIG. 37 illustrates the embodiment of FIG. 1 in a particular rotation and pitch position.
Figure 38:
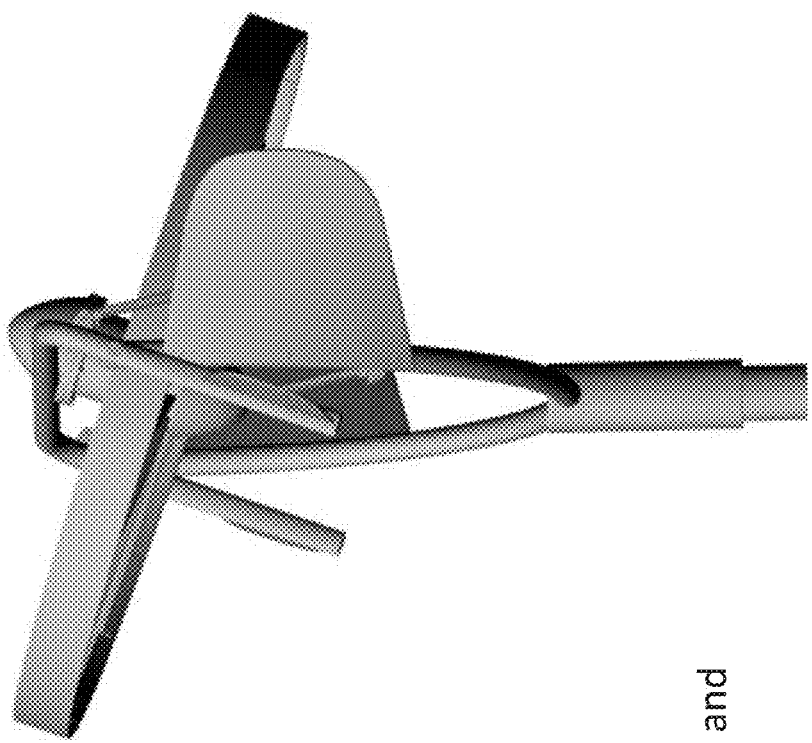
FIG. 38 illustrates the embodiment of FIG. 1 in a particular rotation and pitch position.
Figure 39:
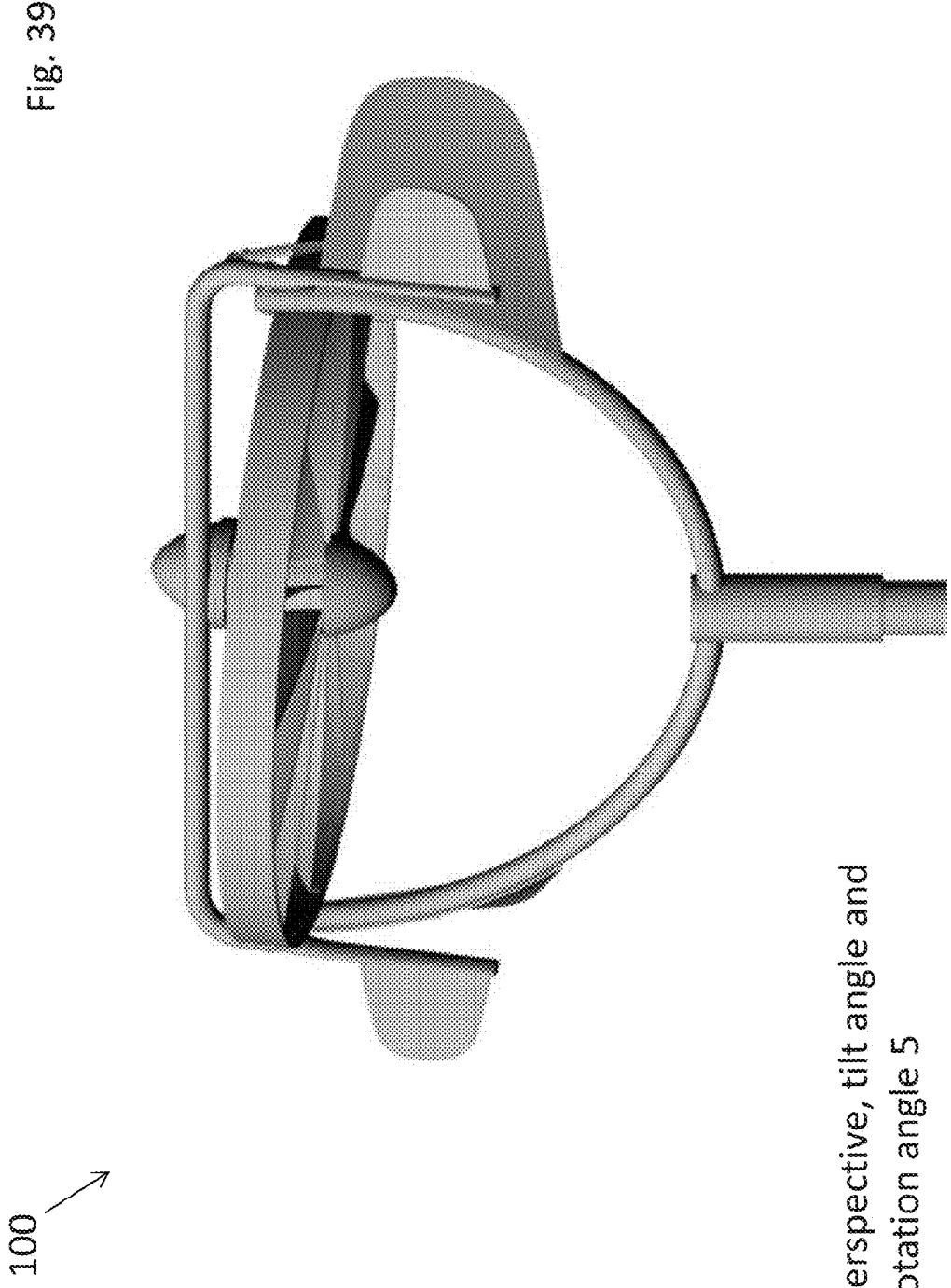
FIG. 39 illustrates the embodiment of FIG. 1 in a particular rotation and pitch position.
Figure 40:
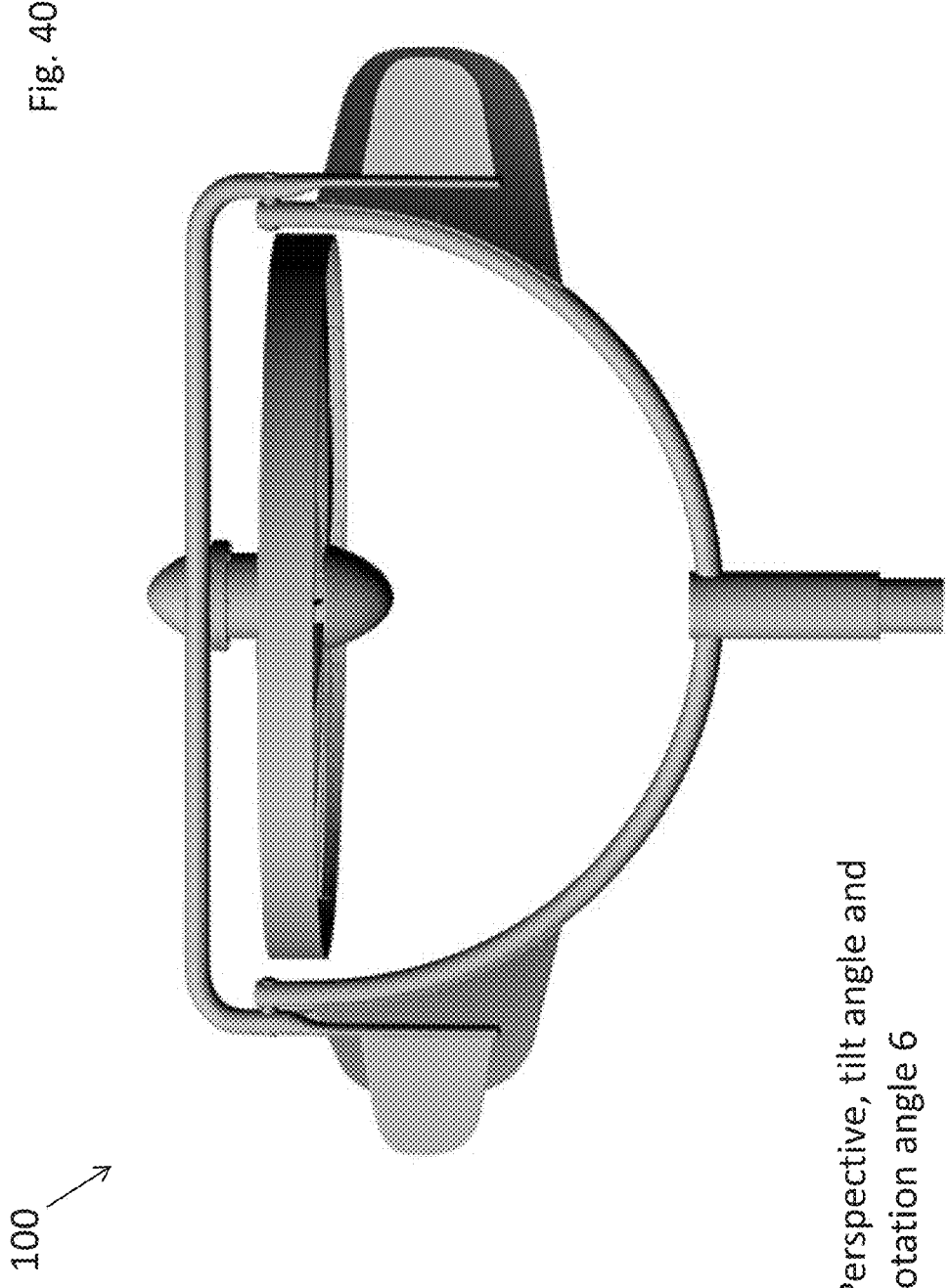
FIG. 40 illustrates the embodiment of FIG. 1 in a particular rotation and pitch position.
Figure 41:
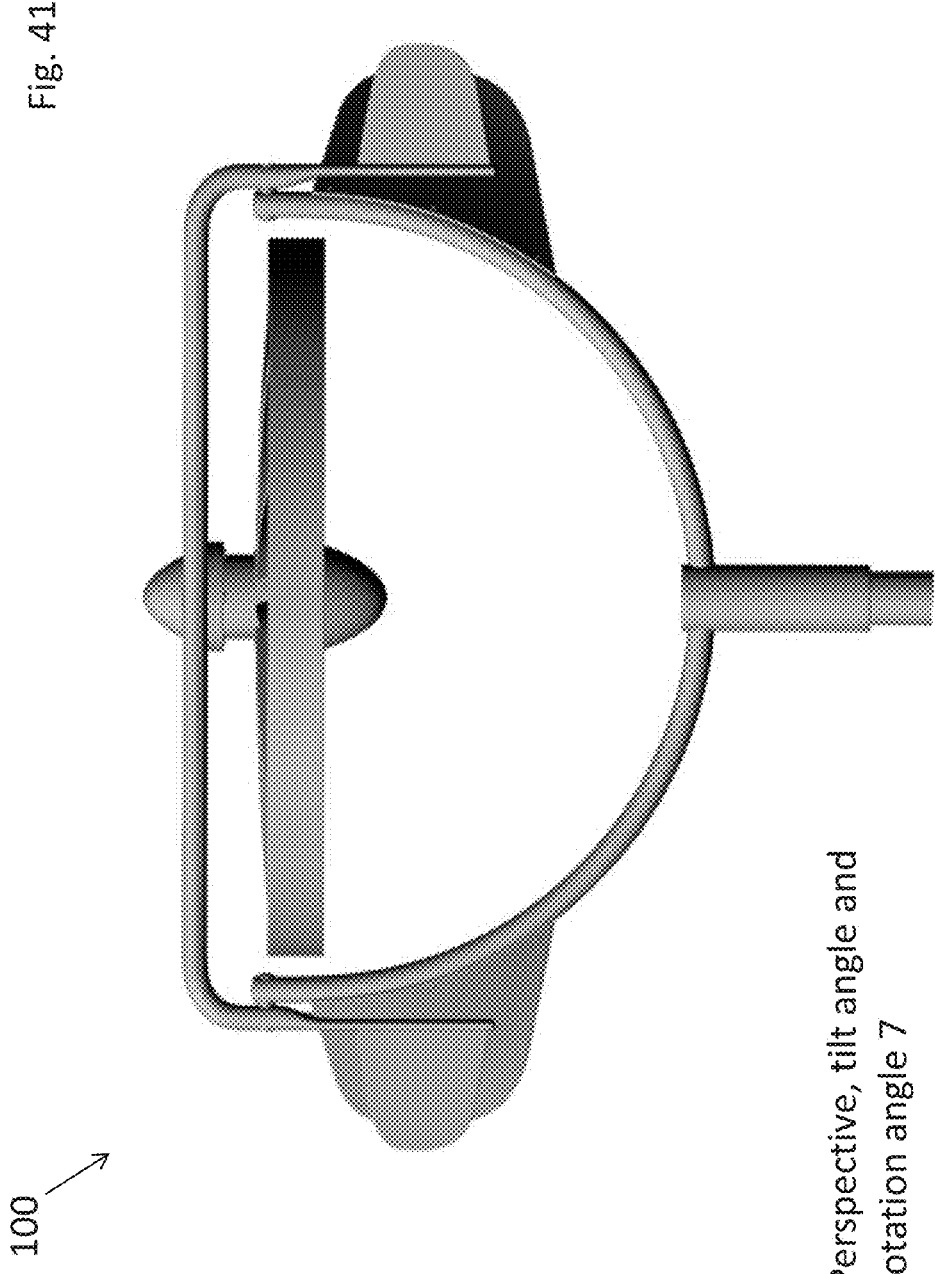
FIG. 41 illustrates the embodiment of FIG. 1 in a particular rotation and pitch position.

Referring now to FIGS. 3, 6 and 28 at least one spring 120 (two are shown in the figures) connect the U-shaped cross bar 110 to a rearward flange extension 122 from the yoke 108. The connection is shown in the figures as on the arms 114 rearward of the pivot connection, but the invention is not so limited.

Referring now to FIGS. 1, 6, 11, 16 and 21, in the absence of wind, no wind pressure is applied to the blades 102. The tension of the spring(s) 120 and the balance of the weight of the turbine 101 and cross bar 110 on the pivot connections induces a slight rearward rotation about tilt axis 230. A maximum rearward rotation of about 10-15 degrees off the vertical is preferred, but the invention is not so limited. Stops (not shown) may be provided to limit the range of this rearward rotation. This position as described and shown in FIG. 1 is generally referred to a rest position.

In the presence of wind on the front side of the turbine 101, the wind applies a uniform pressure on the front face of the turbine 101. If the tilt axis 230 intersected with the roll axis 230, this incoming wind would have no meaningful effect on the tilt of the turbine 101. However, because the tilt axis 230 is higher than and offset from the roll axis 210, the net pressure on the lower portion 720 of the turbine 101 is greater than the upper portion 710 of the turbine 101. This creates an overall additional net force on lower portion 720 of the turbine compared to the upper portion 710 that induces turbine 101 to rotate rearward about the tilt axis 230 against the force of spring 120.

By way of non-limiting example, the tilt axis 230 could divide the turbine into an upper portion 710 that includes about 40% of the surface area of turbine 101, and a lower portion 720 that includes about 60% of the surface area of turbine 101. Since the surface areas are unequal by about 20% (60% of the total net energy is captured by the lower portion 720, and 40% on the upper portion 710), incoming wind induces a tilting rotation of turbine 101 about tilt axis 230 against the spring 230 and gravitational forces by rotating the upper portion 710 forward and the lower portion 720 rearward.

By way of non-limiting example, FIGS. 1-6 in sequence show how, beginning at a rest position in FIG. 1, turbine 101 will rotate about tilt axis 230 as wind speed increases. The individual increments from the orientation of FIG. 1 to those of FIG. 6 are now discussed.

Referring now to FIGS. 2, 7, 12, 17 and 22, eventually the wind will reach sufficient speed that the rotation force applied about the tilt axis 230 brings the turbine 101 into a substantially vertical position. A stable vertical position is not expected as wind always has at least some degree of constant change, as the turbine will tend to oscillate by a few degrees around the vertical in response to wind changes and momentum of the turbine as it rocks about the pivot connections; "substantially vertical" or "substantially vertical position" as used herein thus encompasses this variation in the vertical orientation. Optionally, some retaining mechanism can provide a weak hold to resist movement against minor oscillations, such as a magnetic lock or movement dampening mechanism such as a shock absorber not shown).

When rotating about tilt axis 230 under wind pressure, the turbine 101 itself has a natural movement dampening attribute caused by gyroscopic effect that tends to hold rotating objects in a specific direction. This gyroscopic effect also causes the turbine 101 to rotate slightly about yaw axis 220 whenever the wind causes the turbine 110 to rotate about tilt axis 230 and lean forward. This is a phenomenon of gyroscopic effect and may be beneficial for offloading damaging and gusting winds by tilting the turbine 101 slightly and momentarily sideways away from perpendicular to the wind.

Preferably the design of the components is balanced such that the turbine 101 will reach its substantially vertical position for a particular wind speed, and thus the embodiments may vary to the extent they achieve that balance. The design could be match to the optimal speed for the location. For example, if the area has an annual wind speed of 15 mph, then the components would be designed to balance the turbine in the substantially vertical position at that wind speed; this could be via a custom balance, or predetermined configurations for different wind conditions that are available. For an area with an annual wind speed of 20 mph, a different balance would be used. The tension of the spring(s) 120 and the distance of the paddles 116 from the pivot connections are two structural methodologies for controlling balance, but the invention is not limited thereto.

In the above context, turbine 101 will have a "sweet spot" of wind speed for balance of the turbine 101 in the substantially vertical position. Preferably this sweet spot wind speed would substantially correspond (e.g., ±5 miles per hour) to the annual average wind speed for the geographic area in which the turbine 101 will be used, although this not be the case.

When the wind speed is lower than the sweet spot wind speed, the top of the turbine 101 will rotate rearward about the tilt axis 230 toward some intermediate position between the substantially vertical position (FIG. 2) and the rest position (FIG. 1).

Figure 4:
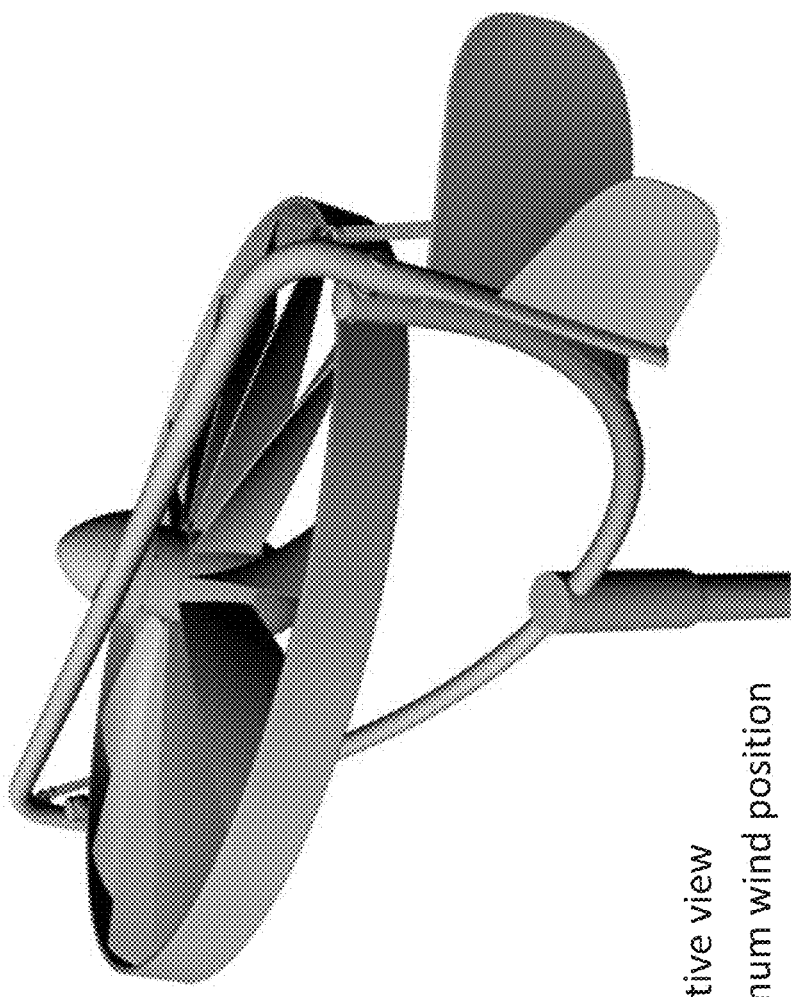
FIG. 4 illustrates the embodiment of FIG. 1 in a higher wind orientation compared to FIG. 3.
Figure 5:
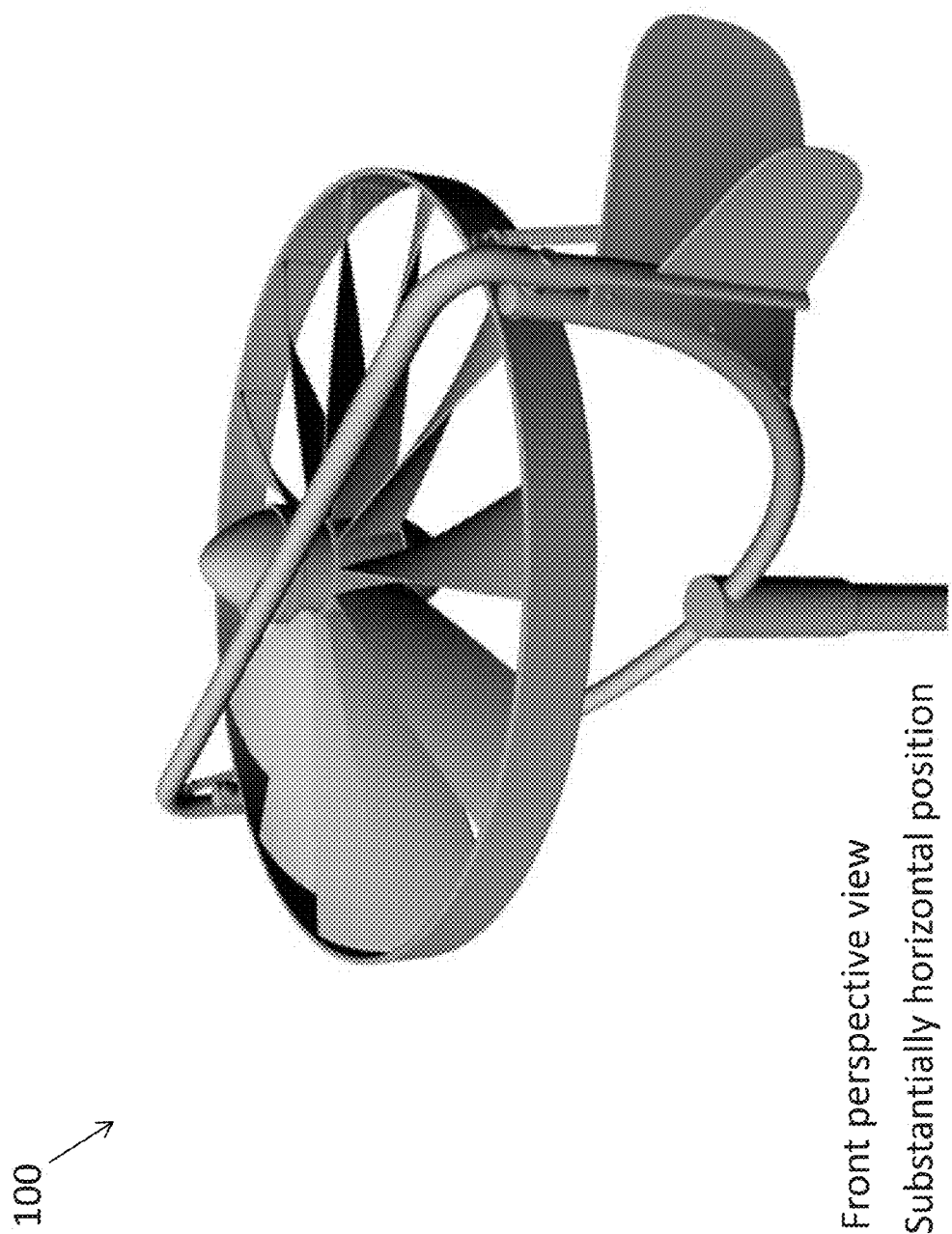
FIG. 5 illustrates the embodiment of FIG. 1 in a substantially horizontal position.

Referring now to FIGS. 3-5, when the wind speed is higher than the sweet spot, the turbine 101 will over-rotate around the tilt axis 230 into a high wind position, which may lie anywhere between the substantially vertical position and a substantially horizontal position based on the strength of the wind. This state of over rotation in response to higher winds is generally referred to a higher wind position, although it is to be understood that this refers to a location within the range as opposed to a specific orientation. FIGS. 3-5 each show a high wind position for turbine 101 for successively higher winds.

For a typical turbine, an increase in wind speed increases the speed at which the turbine spins and place more stress on the supporting structure. However, in the high wind speed position of turbine 101 the full face of the turbine 101 is at an angle to the incoming wind, which reduces turbine efficiency and offsets the effect of the wind speed increase. At small angles proximate to the vertical, the impact of the increase in wind speed is generally offset by the loss in turbine efficiency, such that the net output speed of the turbine remains stable; this allows the turbine to operate safely in higher wind environments while providing power output consistent with the substantially vertical position. At larger angles proximate to the horizontal, the loss of turbine efficiency will substantially exceed the power generated. Thus the orientation of FIG. 5 will tend to generate less power than the orientation of FIG. 3.

Figure 18:
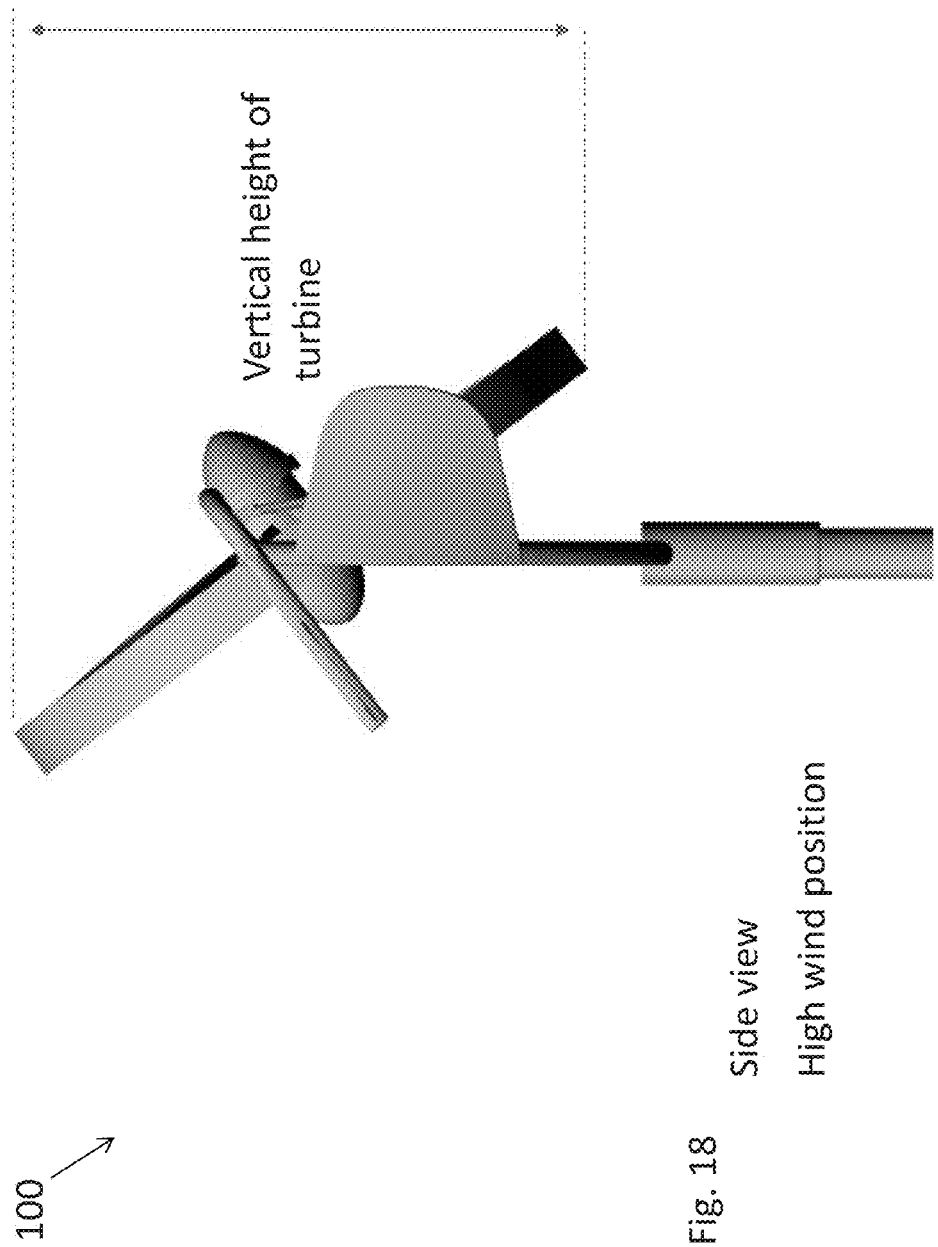
FIG. 18 illustrates the embodiment of FIG. 16 in a higher wind orientation compared to FIG. 17.
Figure 19:
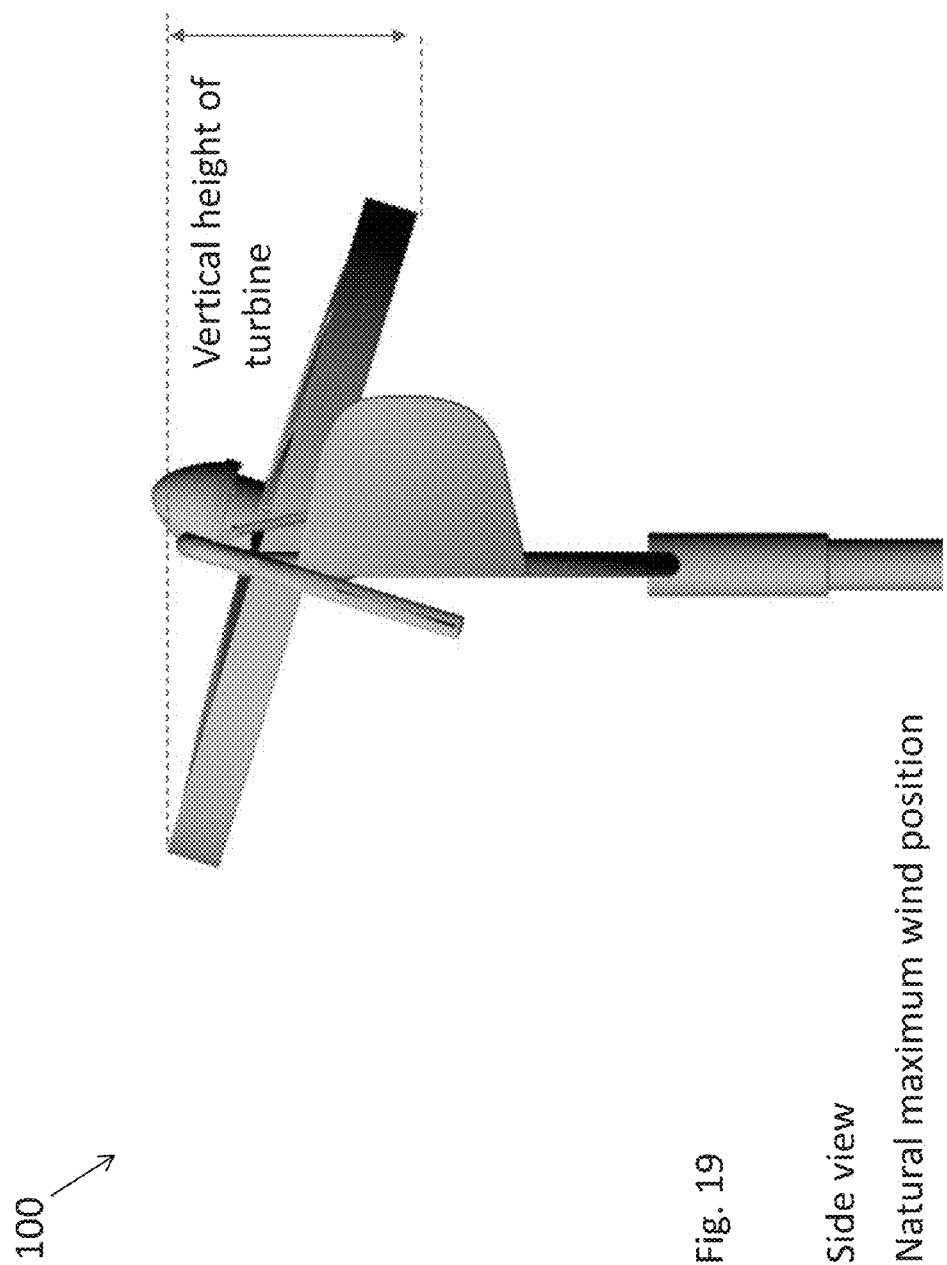
FIG. 19 illustrates the embodiment of FIG. 16 in a higher wind orientation compared to FIG. 18.
Figure 20:
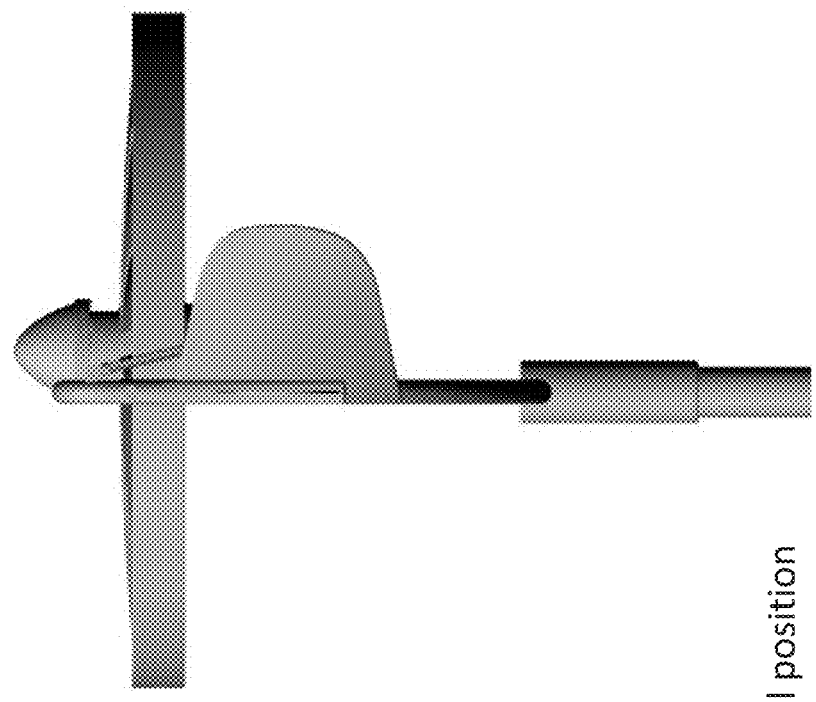
FIG. 20 illustrates the embodiment of FIG. 16 in a substantially horizontal position.
Figure 21:
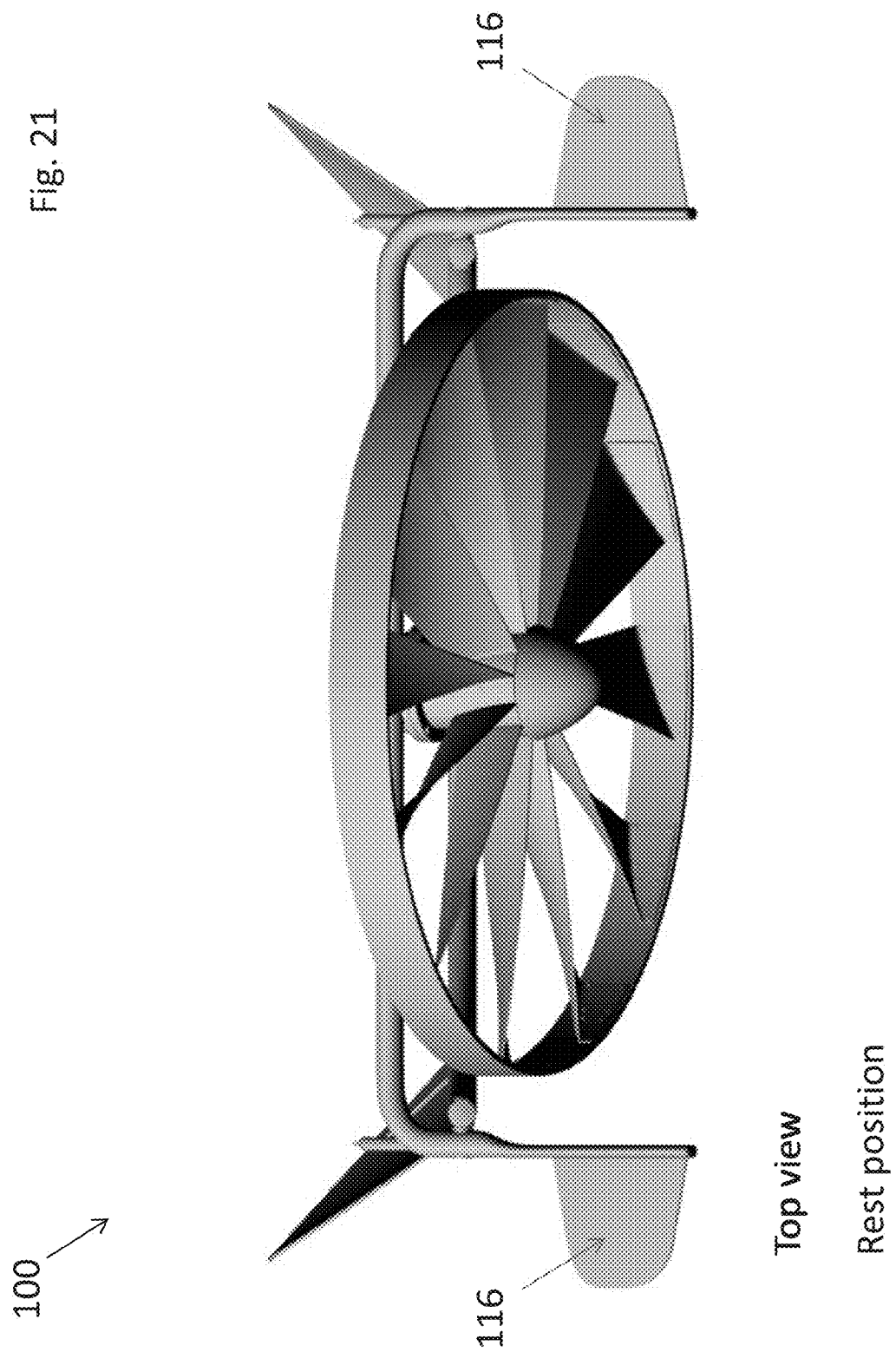
FIG. 21 illustrates a front perspective view of an embodiment of the invention at rest or under minimal wind conditions.
Figure 22:
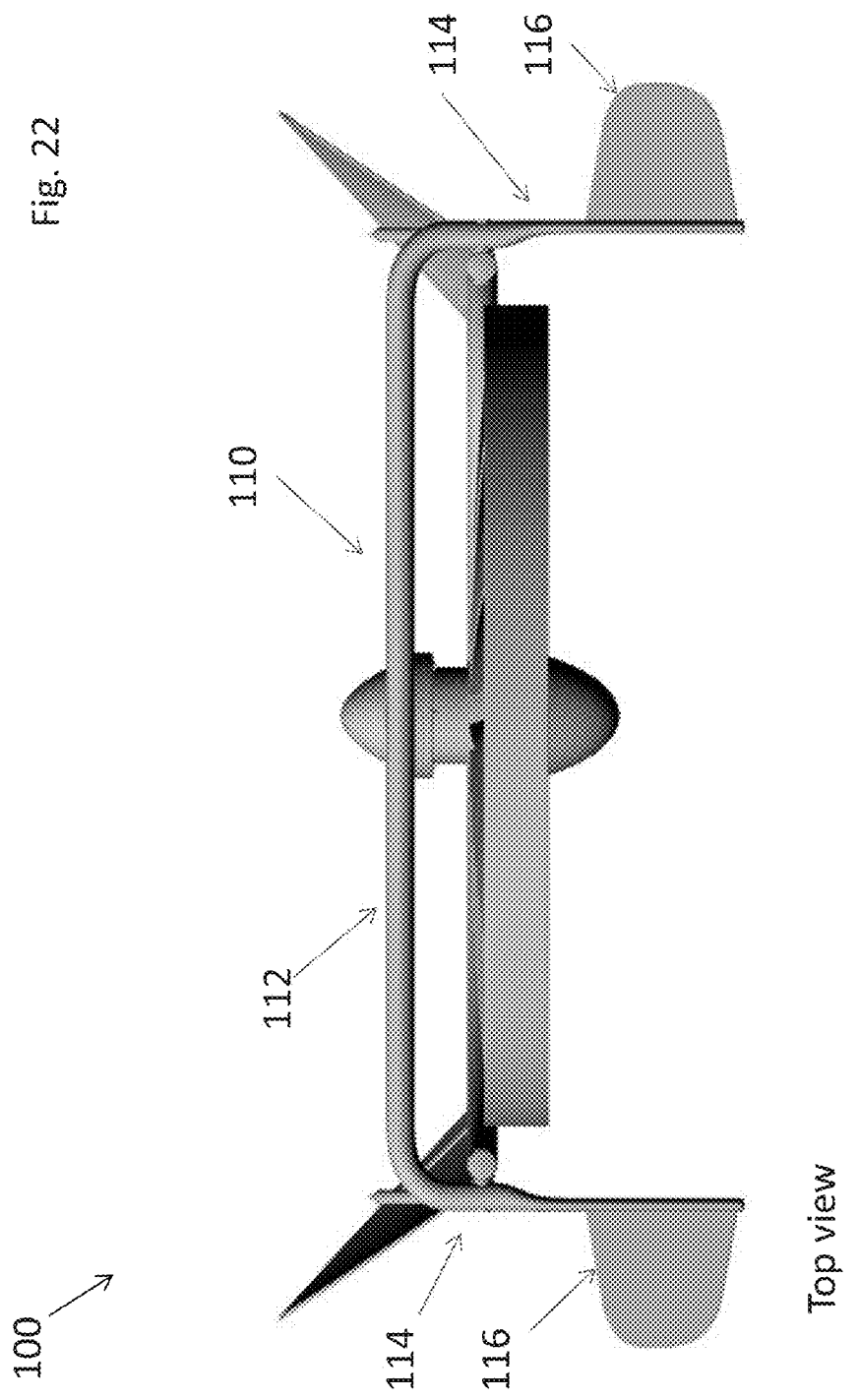
FIG. 22 illustrates the embodiment of FIG. 21 in a higher wind orientation compared to FIG. 21.
Figure 23:
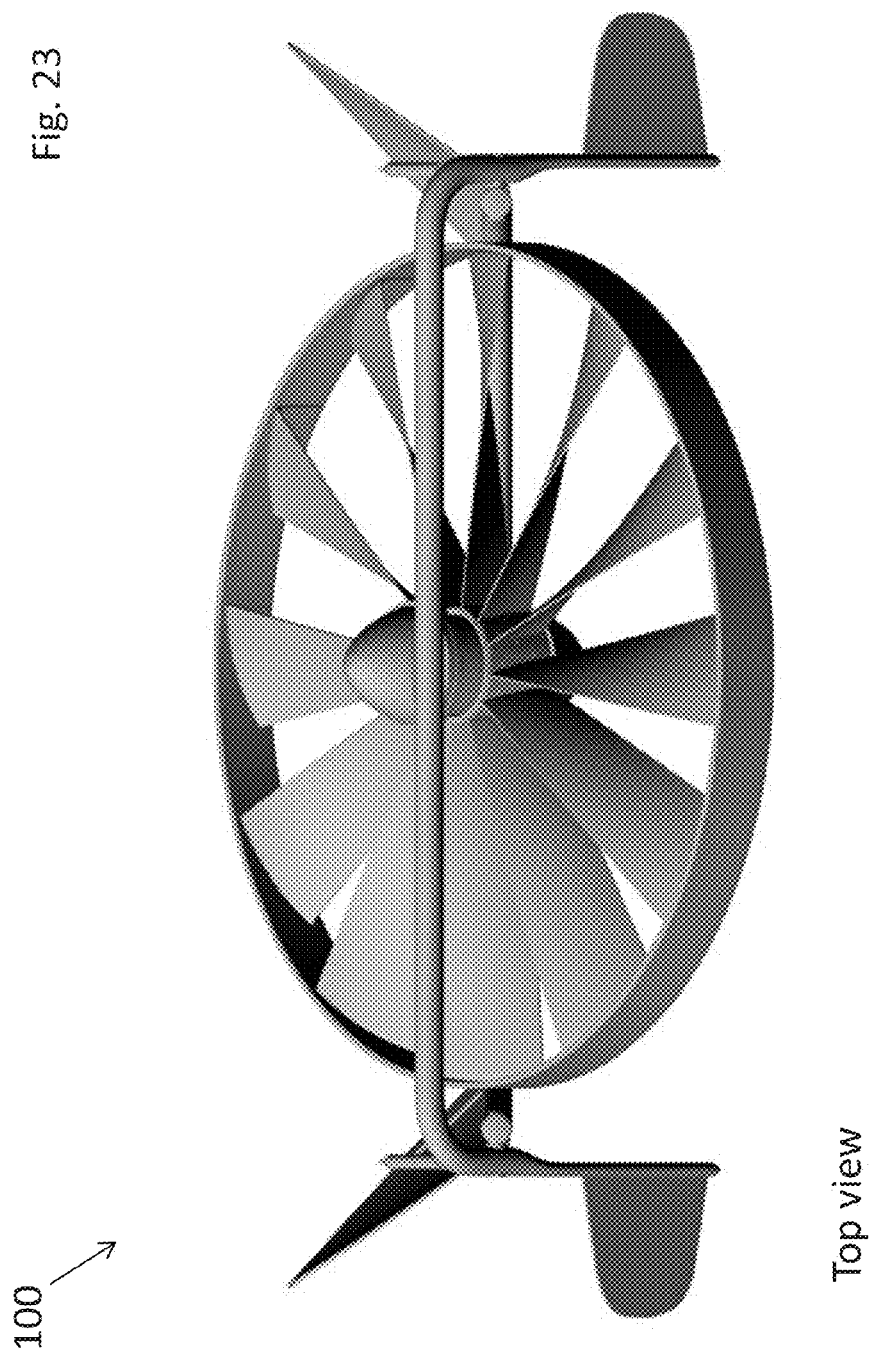
FIG. 23 illustrates the embodiment of FIG. 21 in a higher wind orientation compared to FIG. 22.
Figure 24:
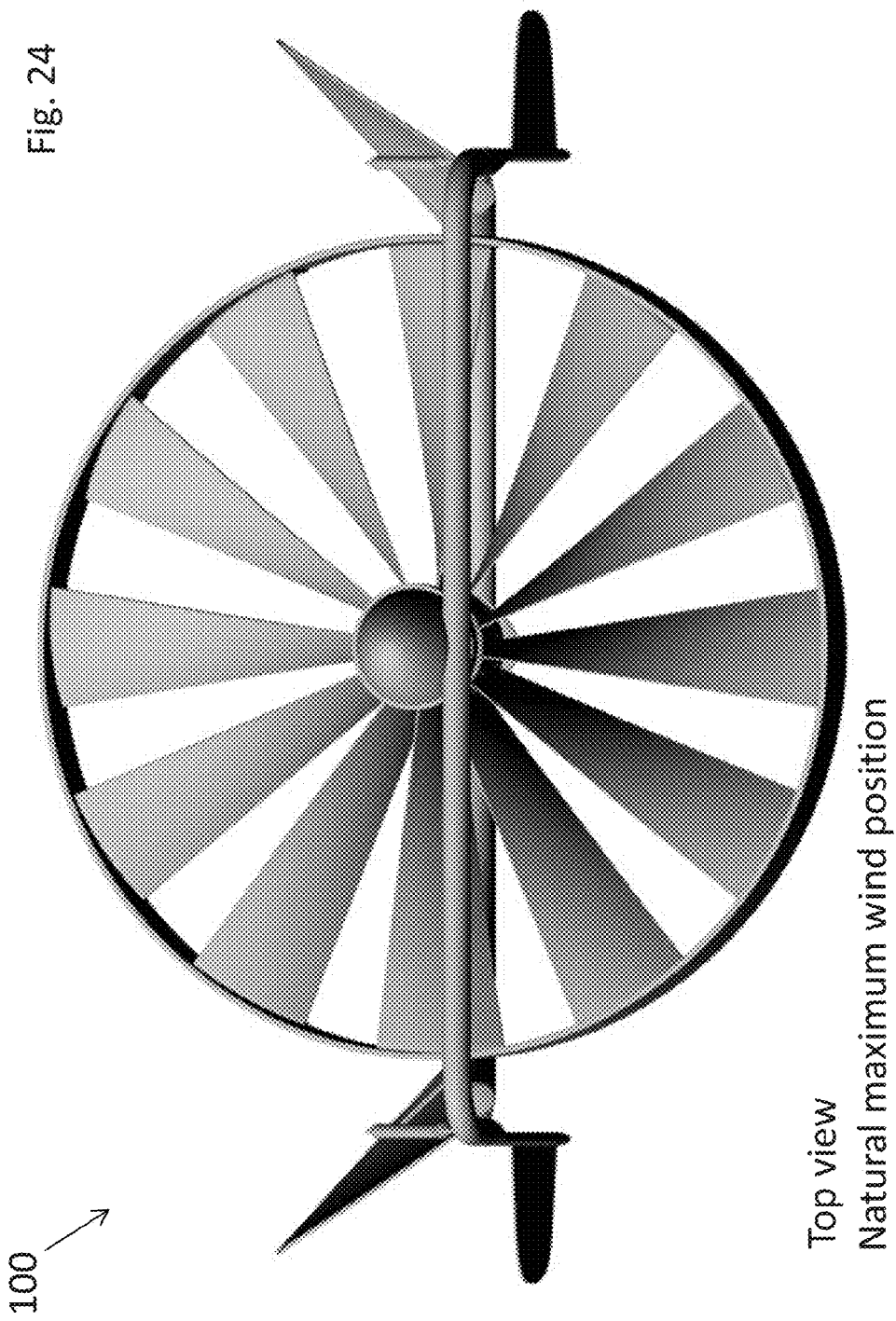
FIG. 24 illustrates the embodiment of FIG. 21 in a higher wind orientation compared to FIG. 23.
Figure 25:
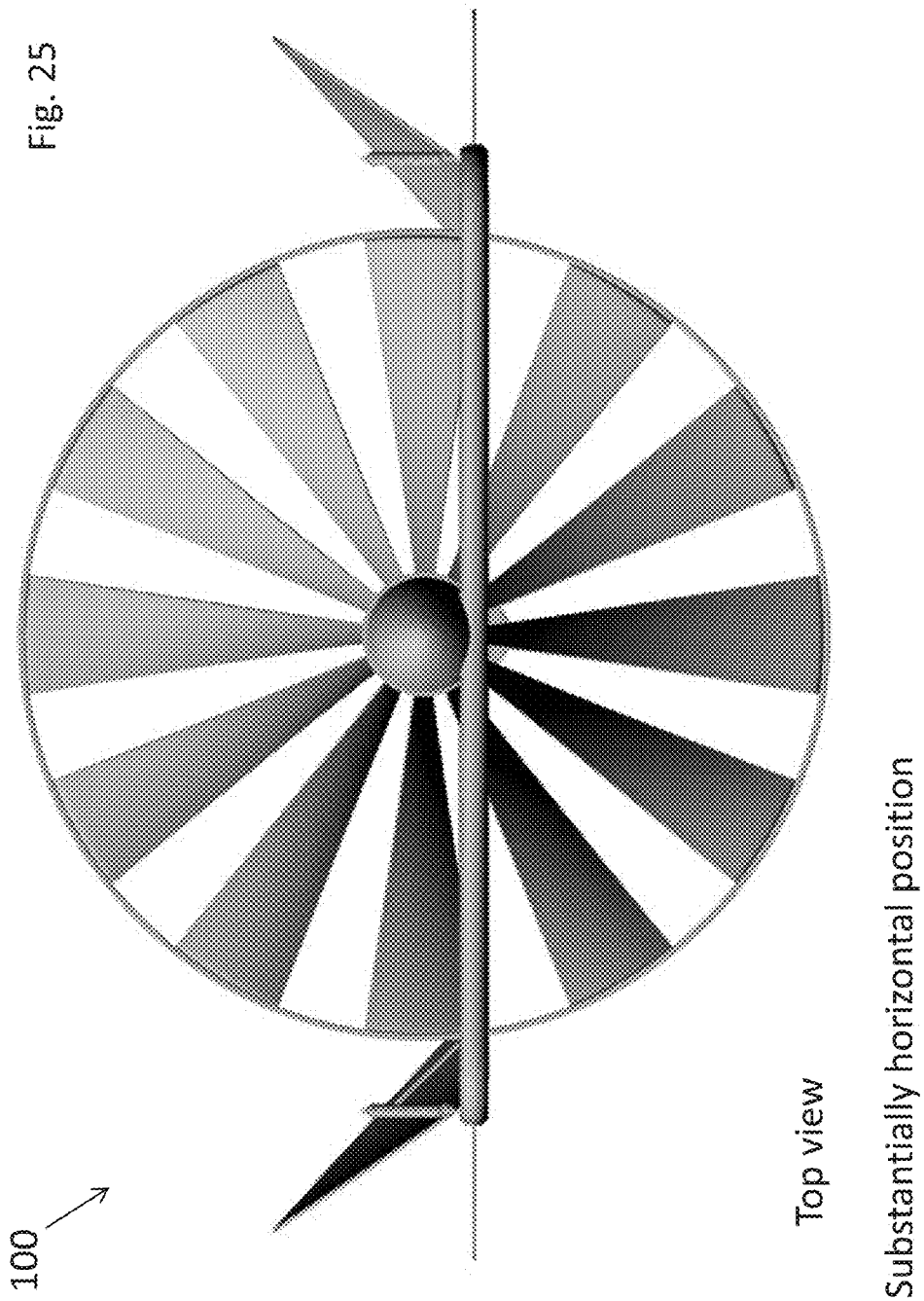
FIG. 25 illustrates the embodiment of FIG. 21 in a substantially horizontal position.
Figure 26:
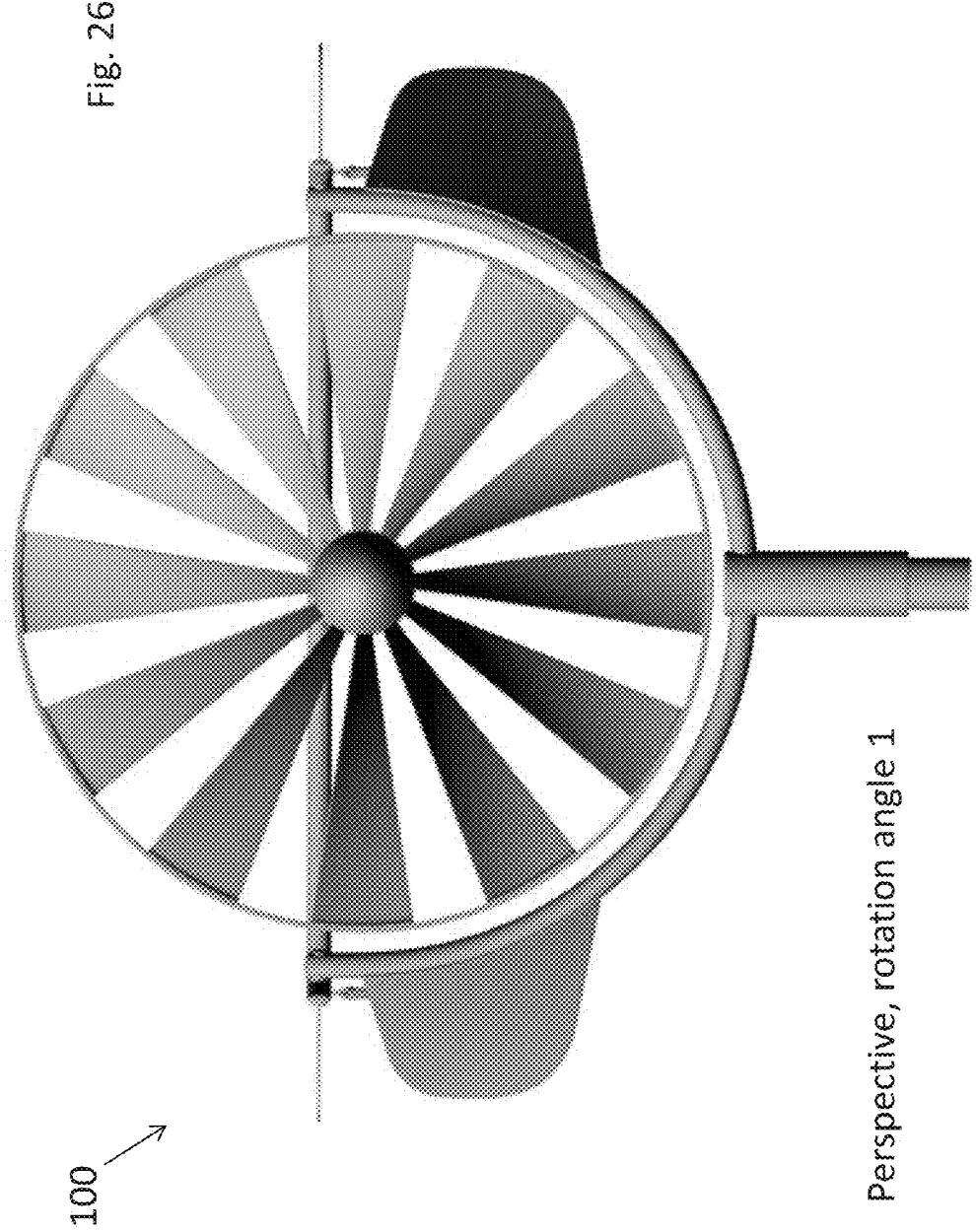
FIG. 26 illustrates the embodiment of FIG. 1 in a particular rotation and pitch position.
Figure 27:
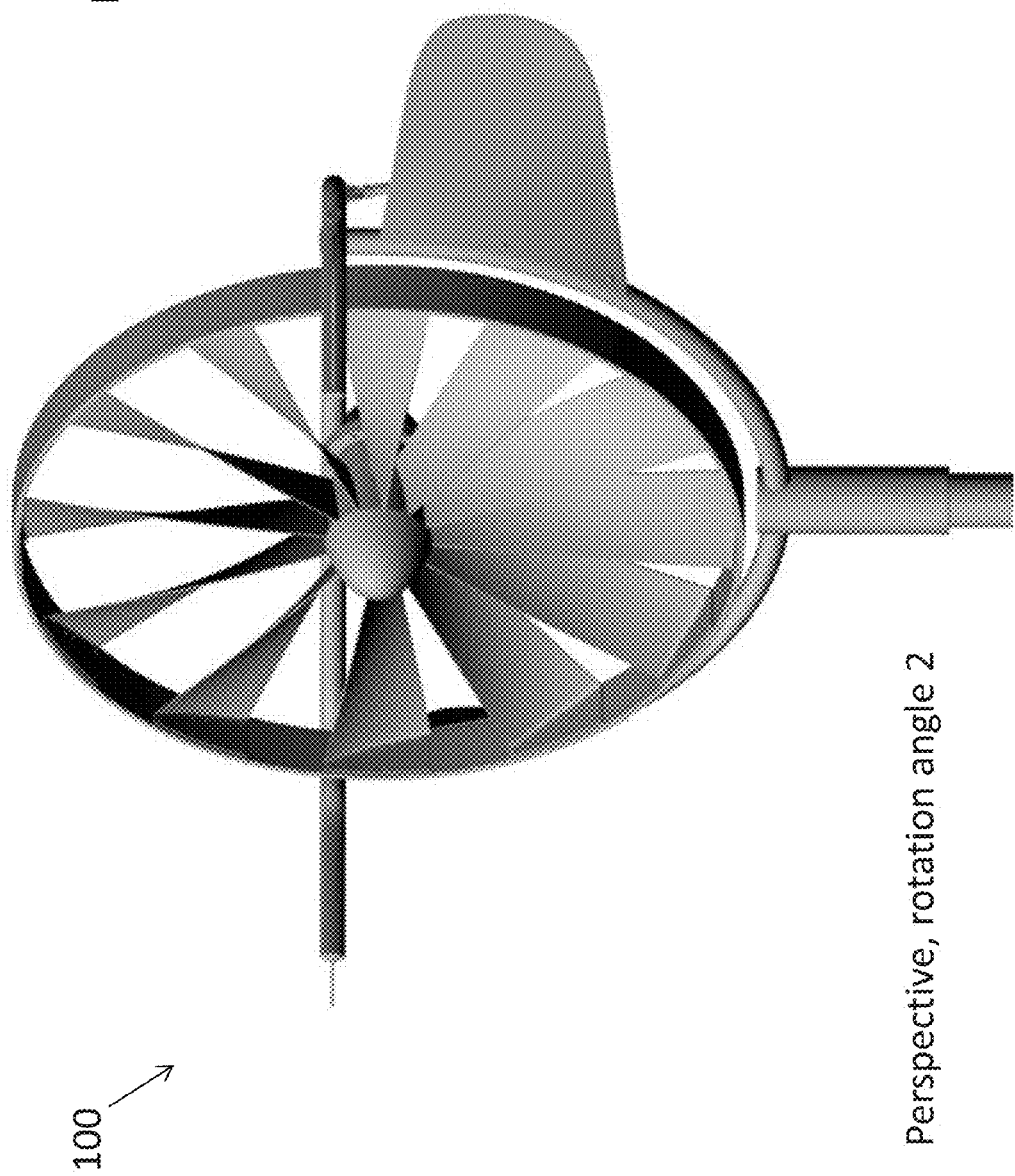
FIG. 27 illustrates the embodiment of FIG. 1 in a particular rotation and pitch position.

A variety of factors contribute to the overall loss of turbine efficiency and thus the strong winds damaging forces. Referring to FIGS. 18 and 19, one contributing factor to the loss is that less wind capture area is provided as the vertical height of the turbine decreases; there is simply less dimensional area of the wind moving through the turbine face. Another factor is that the blades are designed to attack the wind in a vertical orientation, and the tilt angle decreases the engagement efficiency and thus the wind force on the turbine.

During particularly high winds, such as strong storm or hurricane force winds, it is desirable for the turbine 101 past the natural maximum wind position to assume a substantially horizontal position in which the blades 102 have little or no interaction with these gale force winds and the frontal area of the turbine 101 exposed to these forces is greatly reduced. The natural tilt of the turbine 101 about the tilt axis 230 on pivot connections is insufficient to move the turbine 101 into this position since there is not enough area interaction with the wind to support that orientation. At best this tilt would be about 70-80 degrees off the vertical, and is referred to herein as the natural maximum wind position. Preferably it would require at least four times the rated wind speed (e.g., 60 mph for a rated 15 mph turbine) to reach this angle, but the invention is not so limited.

Referring now to FIGS. 2-6, the paddles 116 at the tail ends of the U-shaped cross bar 110 assist in moving the turbine 101 into the substantially horizontal position. As the turbine 101 tilting from the vertical to the horizontal decreases the efficiently of the interaction of the blades 102 with the wind, there is corresponding tilting of the paddles 116 from the horizontal to the vertical (shown progressively by FIGS. 2-6) that increases the engagement of paddle 116 surface area, and efficiency of engagement, with the wind. Eventually the wind force will be sufficient to push on the paddles 116 alone against the weight of the turbine 101 and its spring(s) 120 to move the entire turbine 101 into the substantially horizontal position. The paddles 116 are designed to have surface area large enough to operate in this manner.

Stable horizontal position is not expected as wind always has at least some degree of constant change, as the turbine will tend to oscillate by a few degrees around the horizontal in response to wind changes and momentum of the turbine as it rocks about the pivot connections; "substantially horizontal" or "substantially horizontal position" as used herein thus encompasses this variation in the horizontal orientation. Optionally, some retaining mechanism can provide a weak hold to resist movement against minor oscillations in the high wind speeds, such as a magnetic lock (not shown).

The turbine will remain in the substantially horizontal position until the damaging level winds subside. When the wind is low enough, the weight of the turbine 101 plus some force applied by the spring(s) 120—which is asymmetrically balanced on the pivot connections and thus tends to rotate back toward the vertical under its own weight and the spring force begins to rotate back into engagement with the wind. If a retaining mechanism is provided, it would not be strong enough to withstand this tendency to rotate.

The entire tilting process is entirely automatic in response to the presence of the wind. Control components, sensors and complicated retraction/deployment mechanisms are not necessary. However, the invention does not exclude the presence of such components as compliments to the embodiments.

When the turbine 101 is in its substantial horizontal position the cross-section (or profile width) of the turbine presented has a significantly smaller surface area than it does when it is in its substantially vertical position (facing directly into the wind). This greatly reduces the stresses imparted on the turbine and allowing it to be built significantly lighter than typical wind turbine must be to withstand storm conditions. The byproduct of this is a significant reduction in cost, and an ability to be mounted on structures and/or areas that otherwise cannot withstand the stresses of a standard wind turbine.

The attached figures include front, side, top and perspective views. Additional figures show different angles of rotation about the mast in response to wind direction of the rated wind speed (substantially vertical position), and combinations of different angles of rotation and tilt in response to wind speed and direction.

Referring now to FIGS. 26-41, as noted above turbine 101 can rotate about the yaw axis 220 to face the incoming wind. The position of turbine 101 as shown in FIGS. 1-6 therefore can occur at a variety of rotational angles relative to mast 106. FIGS. 26-41 show non-limiting examples of different orientations that can be achieved, as shown from a variety of view angles.

Figure 42:
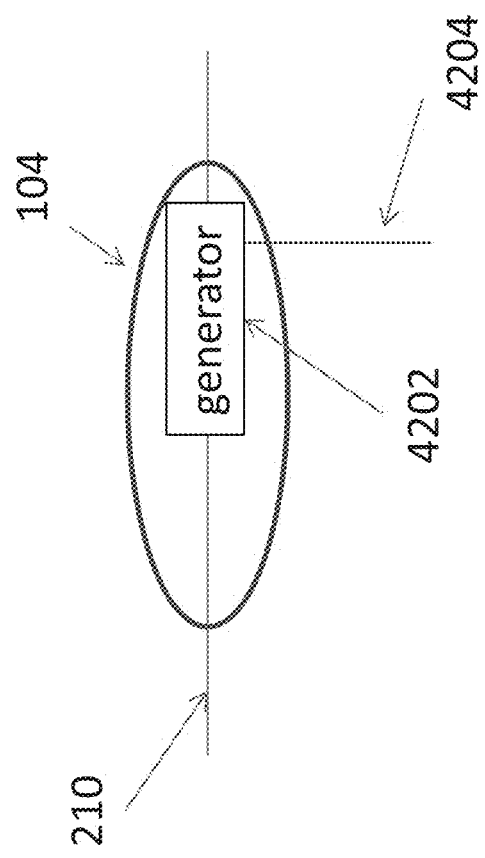
FIG. 42 illustrates the generator driven by the wind turbine.

In the above embodiments mast 106 is below turbine 101. However, the invention is not so limited. Referring now to FIG. 42, mast 160 may be above turbine 101 or at an angle thereto. The yoke 108 would similarly be repositioned, preferably above turbine 101. To provide spring force, spring(s) 120 could be connected as shown in the above embodiment provided some support structure (e.g., a downward extension of yoke 108) was provided. In the alternative, springs could connect from arm 114 of cross bar 110 forward of the pivot connection.

Figure 43:
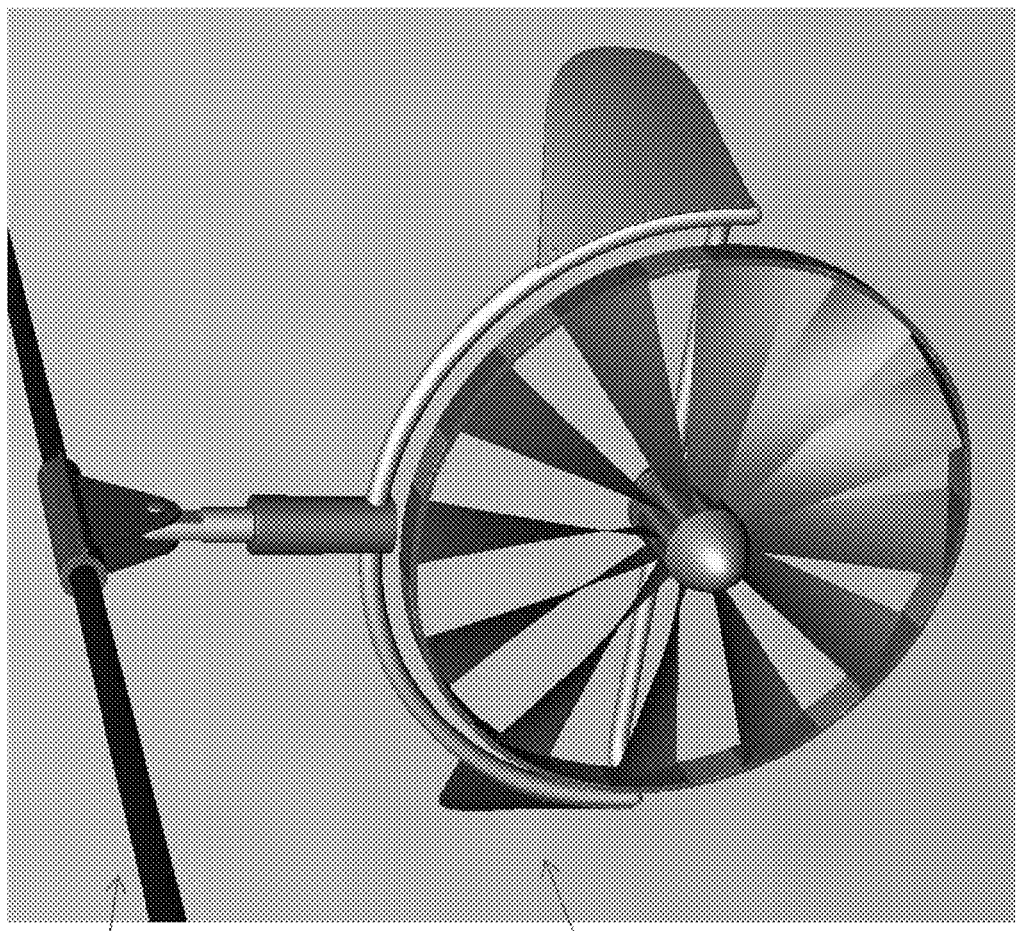
FIG. 43 shows a hanging version of an embodiment of the invention suspended on a cable.
Figure 44:
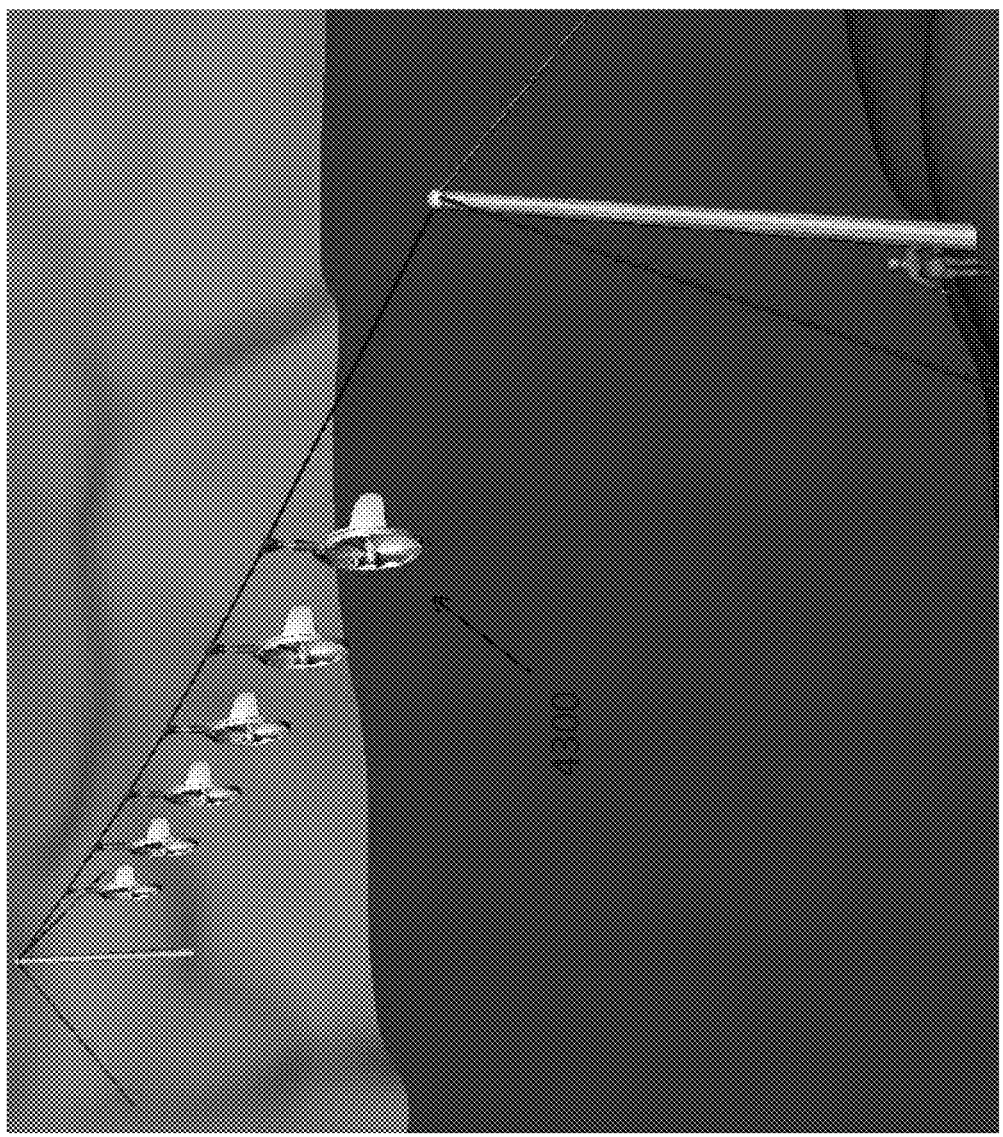
FIG. 44 shows a plurality of hanging embodiments suspended on a cable.

Mast 106 may be mounted on a solid surface, such as a ground mount, or when upside down from an elevated surface (such as an elevated highway). In the alternative, mast 106 can be hanging from a support cable, which may also provide an electrical transmission pathway for outputting power from turbine 101. FIG. 43 shows an example of a hanging wing turbine assembly 4300 (with several components excluded in the illustration for clarity) mounted from a support cable 4302. Several such turbines 4300 can be mounted on a cable, which can be secured to support ground or air supports such as anchors, poles, kites, blimps or the like. FIG. 44 shows an example of several wind turbine assemblies 4302 hanging on a cable across a river.

Figure 45:
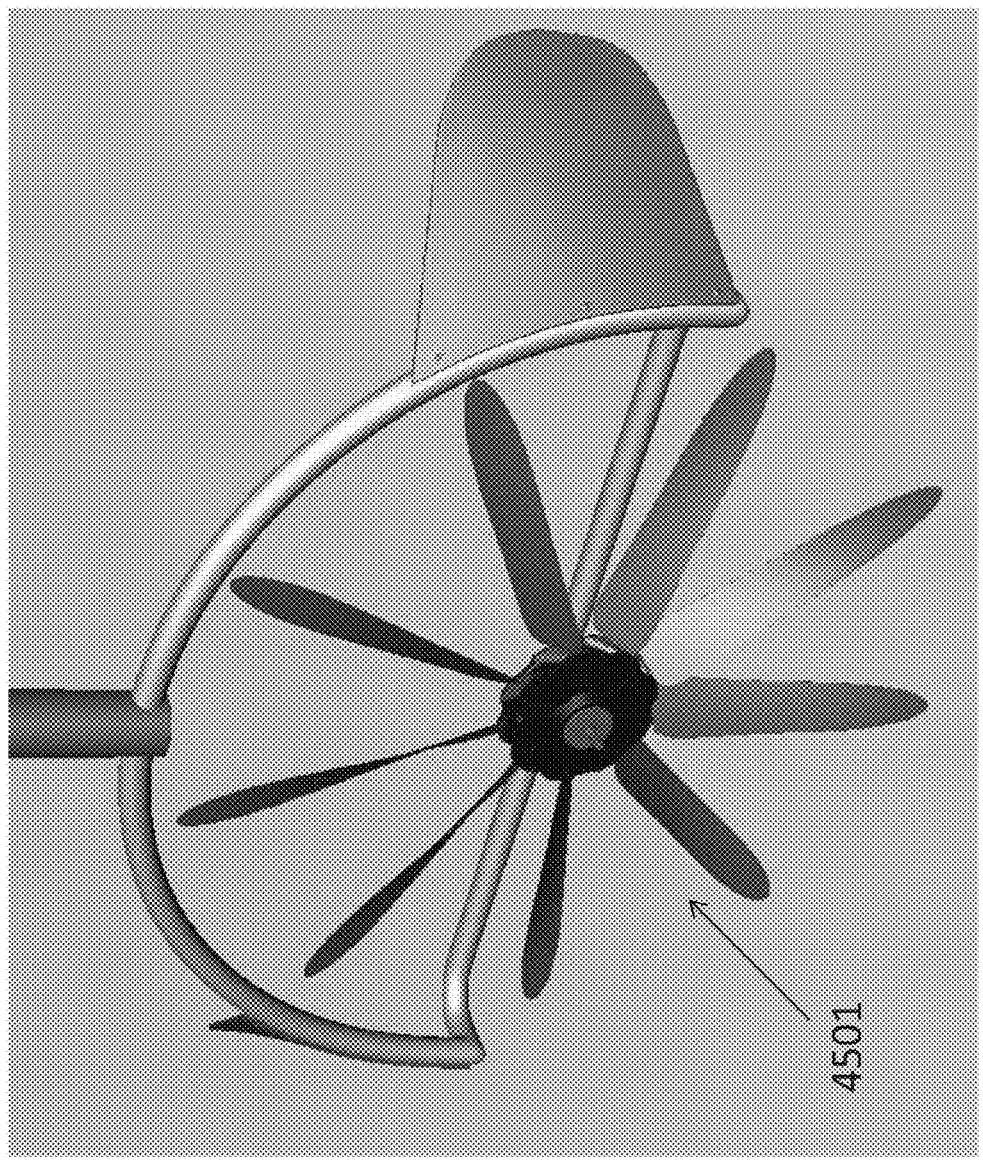
FIG. 45 shows a perspective view of another embodiment of the invention.

As noted above, the invention is not limited to the configuration of wind turbine 101 shown in FIGS. 1-44, and anther turbine configurations may be used. Referring now to FIG. 45, a non-limiting example of an alternative wind turbine 4501 is shown. The particular embodiment is hanging akin to FIG. 43, but the design could also be used as shown in FIGS. 1-41.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A wind turbine assembly comprising:
a support structure;
a wind turbine mounted on the support structure, the wind turbine including:
a front face with blades defining a surface area to engage incoming wind;
a roll axis about which the wind turbine can rotate in response to incoming wind to drive an electric generator;
the support structure defining a horizontal tilt axis about which the wind turbine can pitch forward and backward;
the tilt axis dividing the surface area of the wind turbine into upper and lower portions of unequal size;
wherein incoming wind on the front face of the wind turbine applies unequal force to the upper and lower portions of the surface area of the wind turbine, inducing pitch of the wind turbine about the tilt axis;
wherein the wind turbine and support are balanced to allow the wind turbine to pitch about the tilt axis into plurality of positions based on incoming wind speed, including at least:
a substantially vertical position in response to a particular non-zero wind speed;
a high wind position in response to higher winds than the particular wind speed, the high wind position being at a non-zero angle to the substantially vertical position to reduce physical stress placed on the assembly;
a rest position in response to no wind present, the rest position being at a non-zero angle to the substantially vertical position;
wherein the support structure includes at least one surface configured to increasingly engage with the wind as the wind turbine rotates about the tilt axis in response to higher speed winds above the particular wind speed, wherein under hurricane conditions engagement of the at least one surface with hurricane winds in combination with the balance of the wind turbine and support structure rotates the wind turbine into and maintains a substantially horizontal position, the at least one surface being positioned at a lateral side of the wind turbine and extending in front of the wind turbine.

2. The assembly of claim 1, wherein the at least one surface is a paddle substantially parallel with the roll axis.

3. The assembly of claim 1, wherein the support structure includes at least one spring connected to bias the wind turbine to rotate about the tilt axis in a direction opposite to that induced by incoming wind, and the spring is in its most contracted state when the wind turbine is in the rest position.

4. The assembly of claim 1, wherein the support structure includes a mast, at least one arm connected to the mast and at least partially surrounding the wind turbine, and a support member pivotally connected to the at least one arm and the rear side of the wind turbine.

5. The assembly of claim 1, wherein the wind turbine includes a central hub centered on the roll axis, the front face being mounted on the central hub, and wherein the horizontal tilt axis is parallel to and passes through the central hub of the turbine.

6. The assembly of claim 1, further comprising the support structure including first and second fins configured to engage incoming wind to drive the wind turbine about a yaw axis into alignment with the incoming wind, the first and second fins being mounted on opposite sides of the roll axis.

7. The assembly of claim 1, wherein the tilt axis is above the roll axis, and the upper portion is smaller than the lower portion.

8. A wind turbine assembly comprising:
a support structure;
a wind turbine mounted on the support structure, the wind turbine including:
a front face with blades defining a surface area to engage incoming wind,
a central hub centered on a roll axis, the front face being mounted on the central hub;
a roll axis about which the wind turbine can rotate in response to incoming wind to drive an electric generator;
the support structure defining a horizontal tilt axis about which the wind turbine can pitch forward and backward;
the tilt axis passing through the central hub and dividing the surface area of the wind turbine into upper and lower portions of unequal size, the upper portion being smaller than the lower portion;
wherein incoming wind on the front face of the wind turbine applies unequal force to the upper and lower portions of the surface area of the wind turbine, inducing pitch of the wind turbine about the tilt axis;
wherein the wind turbine and support are balanced to allow the wind turbine to pitch about the tilt axis into plurality of positions based on incoming wind speed, including at least:
a substantially vertical position in response to a particular wind speed;
a high wind position in response to higher winds than the particular wind speed, the high wind position being at a non-zero angle to the substantially vertical position to reduce physical stress placed on the assembly.

9. The assembly of claim 8, wherein the support structure includes at least one surface configured to increasingly engage with the wind as the wind turbine rotates about the tilt axis in response to higher speed winds above the particular wind speed, wherein under hurricane conditions engagement of the at least one surface with hurricane winds in combination with the balance of the wind turbine and support structure rotates the wind turbine into and maintains a substantially horizontal position, the at least one surface being positioned at a lateral side of the wind turbine and extending in front of the wind turbine.

10. The assembly of claim 9, wherein the at least one surface is a paddle substantially parallel with the roll axis.

11. The assembly of claim 8, wherein the support structure includes at least one spring connected to bias the wind turbine to rotate about the tilt axis in a direction opposite to that induced by incoming wind.

12. The assembly of claim 8, wherein the support structure includes a mast, at least one arm connected to the mast and at least partially surrounding the wind turbine, and a support member pivotally connected to the at least one arm and the rear side of the wind turbine.

13. The assembly of claim 8, further comprising the support structure including first and second fins configured to engage incoming wind to drive the wind turbine about a yaw axis into alignment with the incoming wind, the first and second fins being mounted on opposite sides of the roll axis.

14. The assembly of claim 8, wherein the tilt axis is above the roll axis.

15. The assembly of claim 1, a rest position in response to no wind present, the rest position being at a non-zero angle to the substantially vertical position.

16. The wind turbine of claim 1, wherein the non-zero angle of the rest position is 10-15 degrees off a yaw axis of the turbine.

* * * * *